US011064457B2

(12) United States Patent
Bolle et al.

(10) Patent No.: US 11,064,457 B2
(45) Date of Patent: Jul. 13, 2021

(54) PAGING POLICY DIFFERENTIATION IN 5G SYSTEM

(71) Applicant: Telefonaktiebolaget LM Ericsson (publ), Stockholm (SE)

(72) Inventors: Aldo Bolle, Västra Frölunda (SE); Qian Chen, Mölndal (SE); Paul Schliwa-Bertling, Ljungsbro (SE); Stefan Rommer, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 254 days.

(21) Appl. No.: 15/771,740

(22) PCT Filed: Mar. 15, 2018

(86) PCT No.: PCT/EP2018/056504
§ 371 (c)(1),
(2) Date: Apr. 27, 2018

(87) PCT Pub. No.: WO2018/202351
PCT Pub. Date: Nov. 8, 2018

(65) Prior Publication Data
US 2019/0082417 A1  Mar. 14, 2019

Related U.S. Application Data

(60) Provisional application No. 62/502,122, filed on May 5, 2017.

(51) Int. Cl.
*H04W 68/02* (2009.01)
*H04W 88/08* (2009.01)
(Continued)

(52) U.S. Cl.
CPC ............. *H04W 68/02* (2013.01); *H04W 8/08* (2013.01); *H04W 28/0268* (2013.01);
(Continued)

(58) Field of Classification Search
CPC ..... H04W 68/02; H04W 68/00; H04W 76/27; H04W 8/08; H04W 28/0268; H04W 88/08; H04W 88/12; H04W 88/14; H04B 7/0413
See application file for complete search history.

(56) References Cited

U.S. PATENT DOCUMENTS 10,568,008 B2 * 2/2020 Zeller ............... H04W 36/0083
10,681,637 B2 * 6/2020 Cho ..................... H04W 76/20
(Continued)

OTHER PUBLICATIONS

Author Unknown, "Technical Specification Group Radio Access Network; NR; Radio Resource Control (RRC); Protocol specification (Release 15)," Technical Specification 38.331, Version 0.0.2, 3GPP Organizational Partners, Mar. 2017, 13 pages.
(Continued)

*Primary Examiner* — Ivan O Latorre
(74) *Attorney, Agent, or Firm* — Withrow & Terranova, PLLC

(57) ABSTRACT

According to one aspect of the present disclosure, a method of paging policy differentiation in a 5G telecommunications network is provided. A User Plane Function (UPF) receives downlink data for a target User Equipment (UE), and provides a data notification to a Session Management Function (SMF), the data notification comprising a Quality of Service (QoS) indicator, which the SMF uses to determine QoS Information (QoSI) that is sent to an Access Management Function (AMF). The AMF determines whether a paging policy selection should be performed by the AMF or by a Radio Access Node (RAN) that serves the target UE: if by the AMF, the AMF selects a paging policy based on the QoSI and sends a paging message to the RAN, which pages the UE; if by the RAN, the AMF provides paging policy information to the RAN, which selects a paging policy and pages the UE accordingly.

17 Claims, 9 Drawing Sheets

(51) Int. Cl.
  *H04W 88/12* (2009.01)
  *H04W 88/14* (2009.01)
  *H04W 68/00* (2009.01)
  *H04W 76/27* (2018.01)
  *H04W 8/08* (2009.01)
  *H04W 28/02* (2009.01)
  *H04B 7/0413* (2017.01)

(52) U.S. Cl.
  CPC ........... *H04W 68/00* (2013.01); *H04W 76/27* (2018.02); *H04W 88/08* (2013.01); *H04W 88/12* (2013.01); *H04W 88/14* (2013.01); *H04B 7/0413* (2013.01)

(56) References Cited

U.S. PATENT DOCUMENTS

| | | | | |
|---|---|---|---|---|
| 2010/0265872 | A1* | 10/2010 | Wu | H04B 7/15557 370/315 |
| 2011/0310804 | A1* | 12/2011 | Beygzadeh | H04W 68/00 370/328 |
| 2012/0157132 | A1* | 6/2012 | Olsson | H04W 68/00 455/458 |
| 2014/0064124 | A1* | 3/2014 | Paladugu | H04W 76/19 370/252 |
| 2015/0141062 | A1* | 5/2015 | Ostrup | H04W 68/04 455/458 |
| 2015/0373608 | A1* | 12/2015 | Zhu | H04W 76/25 370/252 |
| 2017/0317894 | A1* | 11/2017 | Dao | H04W 28/24 |
| 2018/0199398 | A1* | 7/2018 | Dao | H04W 36/0016 |
| 2019/0007992 | A1* | 1/2019 | Kim | H04W 64/006 |
| 2019/0246375 | A1* | 8/2019 | Ke | H04W 68/02 |
| 2019/0254109 | A1* | 8/2019 | Lee | H04W 76/27 |
| 2019/0320476 | A1* | 10/2019 | Wang | H04W 28/0268 |

OTHER PUBLICATIONS

Author Unknown, "Technical Specification Group Services and System Aspects; General Packet Radio Service (GPRS) enhancements for Evolved Universal Terrestrial Access Network (E-UTRAN) access (Release 9)," Technical Specification 23.401, Version 9.2.0, 3GPP Organizational Partners, Sep. 2009, 245 pages.

Author Unknown, "Technical Specification Group Services and System Aspects; General Packet Radio Service (GPRS) enhancements for Evolved Universal Terrestrial Access Network (E-UTRAN) access (Release 14)," Technical Specification 23.401, Version 14.3.0, 3GPP Organizational Partners, Mar. 2017, 386 pages.

Author Unknown, "Technical Specification Group Services and System Aspects; System Architecture for the 5G System; Stage 2 (Release 15)," Technical Specification 23.501, Version 0.4.0, 3GPP Organizational Partners, Apr. 2017, 124 pages.

Author Unknown, "Technical Specification Group Services and System Aspects; System Architecture for the 5G System; Stage 2 (Release 15)," Technical Specification 23.501, Version 15.0.0, 3GPP Organizational Partners, Dec. 2017, 181 pages.

Author Unknown, "Technical Specification Group Services and System Aspects; Procedures for the 5G System; Stage 2 (Release 15)," Technical Specification 23.502, Version 0.3.0, 3GPP Organizational Partners, Mar. 2017, 115 pages.

Author Unknown, "Technical Specification Group Services and System Aspects; Procedures for the 5G System; Stage 2 (Release 15)," Technical Specification 23.502, Version 15.0.0, 3GPP Organizational Partners, Dec. 2017, 258 pages.

Author Unknown, "Technical Specification Group Services and System Aspects; Study on Architecture for Next Generation System (Release 14)," Technical Report 23.799, Version 14.0.0, 3GPP Organizational Partners, Dec. 2016, 522 pages.

Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 14)," Technical Specification 29.274, Version 14.3.0, 3GPP Organizational Partners, Mar. 2017, 369 pages.

Author Unknown, "Technical Specification Group Radio Access Network; Evolved Universal Terrestrial Radio Access Network (E-UTRAN); S1 Application Protocol (S1AP) (Release 14)," Technical Specification 36.413, Version 14.1.0, 3GPP Organizational Partners, Jan. 2017, 333 pages.

Ericsson, "S2-178117: Paging differentiation," Third Generation Partnership Project (3GPP) SA WG2 Temporary Document, Oct. 23-27, 2017, Ljubljana, Slovenia, 2 pages.

Ericsson, "S2-178145: Additional paging information for RRC inactive state," Third Generation Partnership Project (3GPP) SA WG2 Temporary Document, Oct. 23-27, 2017, Ljubljana, Slovenia, 4 pages.

Kim, Junseok et al., "3GPP SA2 Architecture and Functions for 5G Mobile Communication System," ICT Express, vol. 3, Issue 1, ISSN 2405-9595, https://doi.org/10.1016/j.icte.2017.03.007, Mar. 14, 2017, 8 pages.

Nokia, et al., "S2-177895: 23.501: Paging policy differentiation," Third Generation Partnership Project (3GPP) SA WG2 Meeting #123, Oct. 23-27, 2017, Ljubljana, Slovenia, 2 pages.

Author Unknown, "Technical Specification Group Services and System Aspects; System Architecture for the 5G System; Stage 2 (Release 15)," Technical Specification 23.501, Version 0.4.0, 3GPP Organizational Partners, Apr. 2017, 123 pages.

Author Unknown, "Technical Specification Group Services and System Aspects; Procedures for the 5G System; Stage 2 (Release 15)," Technical Specification 23.502, Version 0.3.0, 3GPP Organizational Partners, Mar. 2017, 116 pages.

International Search Report and Written Opinion for International Patent Application No. PCT/EP2018/056504, dated Jun. 4, 2018, 16 pages.

* cited by examiner

PAGING POLICY DIFFERENTIATION IN 5G SYSTEM

RELATED APPLICATIONS

This application is a 35 U.S.C. § 371 national phase filing of International Application No. PCT/EP2018/056504, filed Mar. 15, 2018, which claims the benefit of provisional patent application Ser. No. 62/502,122, filed May 5, 2017, the disclosures of which are hereby incorporated herein by reference in their entireties.

TECHNICAL FIELD

The present disclosure generally relates to the process of User Equipment (UE) paging, and more specifically to paging policy differentiation in a Fifth Generation (5G) telecommunication system.

BACKGROUND

When a network has data that is to be sent to a User Equipment (UE), the network engages in a Network Triggered Service Request. In order to locate the UE, this may involve a function known as "paging," e.g., broadcasting a message to the last known location or locations of a UE and listening for a response. Paging can take different approaches, which are defined by a "paging policy." A paging policy may dictate how the paging should be carried out in the registration area in terms of the scope of the paging area (how widely should the page be broadcast), the paging response time (how long should the network wait for the UE to respond), the repetition logic (how many times should the page be made before giving up due to no response from the UE), and other aspects of paging. The paging policy may dictate when a paging request message is delivered to the individual base stations or equivalent in the paging area, what the paging priority should be, and whether assistance data for paging information should set. One paging policy may be used under one set of circumstances while another paging policy may be used under other circumstances. Thus, some entity within a network may perform a "paging policy differentiation" function to determine which paging policy to apply for any particular paging request received from the network.

The Fifth Generation (5G) paging policy differentiation is based primarily on the paging policy defined for a prior technology, Evolved Packet System (EPS). For example, the current 5G Technical Specification (TS) related to paging differentiation, Third Generation Partnership Project (3GPP) TS 23.502, Version 15.0.0, Technical Specification Group Services and System Aspects; Procedures for the 5G System; Stage 2 (Release 15)," herein referred to as "TS 23.502," was copied from the equivalent EPS specification, 3GPP TS 23.401, Version 14.3.0, Technical Specification Group Services and System Aspects; General Packet Radio Service (GPRS) enhancements for Evolved Universal Terrestrial Radio Access Network (E-UTRAN) access (Release 14), herein referred to as "TS 23.401." To understand some of the problems that have arisen as a result, it is helpful to first understand how an EPS network handles network triggered service requests.

Network Triggered Service Request—EPS

FIG. 1A illustrates some of the functional blocks within a conventional EPS network architecture and the named interfaces between them. FIG. 1A includes an Home Subscriber Service (HSS), a Mobility Management Entity (MME), a Serving GPRS Support Node (SGSN), a UE, an E-UTRAN node, a Serving Gateway (SGW), and a Packet Data Network (PDN) Gateway (P-GW). The named interfaces are logical connections between entities.

FIG. 1B illustrates a conventional EPS network triggered service request process. In Step 100, the SGW receives downlink data; in Step 102, the SGW issues a Downlink Data Notification (DDN) to the MME; in Step 104, the MME pages the Evolved or Enhanced Node B (eNB); in Step 106, the eNB pages the UE, which triggers the UE-Triggered Service Request Procedure in Step 108. Once this procedure is complete, downlink data is transferred to the UE via the eNB (Step 110).

In EPS, the MME can make paging policy differentiation among bearers on its own, based on bearer Quality of Service (QoS) information since it has the bearer QoS information. Among bearer QoS parameters, a QoS Class Identifier (QCI) value and an Allocation and Retention Priority (ARP) value are two important values. The assumption is that the SGW provides a separate DDN in case downlink data is received on a higher priority bearer, but MME can't make differentiation for different data flows in the same bearer. For this reason, "paging and service information" is provided via the S11 interface as assistance information to the MME. The MME can then use this assistance information in addition to the bearer QoS information to make paging policy differentiation decisions.

The Information Element (IE) for providing paging and service information is described in 3GPP TS 29.274, Section 8.117 Paging and Service Information. This IE, which is transmitted via the S11 interface from the SGW to the MME, is coded as shown below:

| Octets | Bits | | | | | | | |
|---|---|---|---|---|---|---|---|---|
| | 8 | 7 | 6 | 5 | 4 | 3 | 2 | 1 |
| 1 | Type 186 (decimal) | | | | | | | |
| 2 to 3 | Length = n | | | | | | | |
| 4 | Spare | | | | Instance | | | |
| 5 | Spare (all bits set to 0) | | | | EPS Bearer ID (EBI) | | | |
| 6 | Spare | | | | | | | PPI |
| m | Spare | Paging Policy Indication (PPI) value | | | | | | |
| p to (n + 4) | These octet(s) is/are present only if explicitly specified | | | | | | | |

The EPS Bearer Identifier (EBI) value, in octet 5, indicates the EBI for which the Paging and Service Information is provided. The EBI field shall be encoded as the EBI field in the EBI IE type (see sub clause 8.8 of TS 29.274).

The Paging Policy Indication (PPI) flag in octet 6 indicates whether the PPI value in octet 'm' shall be present. If PPI is set to "1" then the PPI value shall be present. If PPI is set to "0" then octet "m" shall not be present.

The PPI value in octet "m" shall be encoded as the Differentiated Services Code Point (DSCP) in Type of Service (TOS) (IPv4) or Textual Convention (TC) (IPv6) information received in the Internet Protocol (IP) payload of the GPRS Tunneling Protocol User Plane (GTP-U) packet from the Packet Gateway (PGW) (see Internet Engineering Task Force (IETF) Request for Comments (RFC) 2474 [65]).

The IE for indicating paging priority for paging a UE is described in 3GPP TS 36.413, Section 9.2.1.78 Paging Priority. This IE is coded as shown below:

| IE/Group Name | Presence | Range | IE type and reference | Semantics description |
|---|---|---|---|---|
| Paging Priority | M | | ENUMERATED (PrioLevel1, PrioLevel2, PrioLevel3, PrioLevel4, PrioLevel5, PrioLevel6, PrioLevel7, PrioLevel8, . . . ) | Lower value codepoint indicates higher priority. |

The IE for providing assistance information for paging optimization is described in 3GPP TS 36.413, Section 9.2.1.103 Assistance Data for Paging. This IE is coded as shown below:

| IE/Group Name | Presence | Range | IE type and reference | Semantics description |
|---|---|---|---|---|
| Assistance Data for Recommended Cells | O | | 9.2.1.104 | |
| Assistance Data for CE capable UEs | O | | 9.2.1.108 | |
| Paging Attempt Information | O | | 9.2.1.110 | |

Network Triggered Service Request—5G

FIG. 1C illustrates some of the functional blocks within a 5G network architecture and the named interfaces between them. FIG. 10 includes an Authentication Server Function (AUSF), a Unified Data Management (UDM) block, a Core Access and Authentication Management Function (AMF), a Session Management Function (SMF), a Policy Control Function (PCF), an Application Function (AF), a UE, a (Radio) Access Network ((R)AN), a User Plane Function (UPF), and a Data Network (DN). For simplicity, the (R)AN will be hereinafter referred to as "the RAN." The named interfaces are logical connections between entities.

Unlike the EPS, where the paging policy differentiation is handled by one entity, the MME, the 5G system scatters that responsibility among the UPF, the SMF, and the AMF. Unlike the EPS, where the MME has access to QoS information, some entities within the 5G system that may perform paging policy differentiation, such as the SMF and AMF, do not have access to QoS information. Thus, although the AMF (or RAN) are the paging differentiation execution points in 5G, current 5G standards do not specify any mechanism by which the AMF or RAN are provided with QoS information for use for paging differentiation. This despite the fact that, in the EPS systems upon which the current 5G architecture was modeled, the EPS paging differentiation execution point—the MME—is provided with QoS information, which the MME uses to make paging differentiation decisions.

SUMMARY

The subject matter of the present disclosure is directed to delivery of paging policy differentiation information between User Plane Function (UPF)/Session Management Function (SMF) and Authentication Management Function (AMF), e.g., based on new Quality of Service (QoS) mode, i.e., QoS Flow Identifier (QFI), and presents a new way of providing paging policy differentiation information to a Radio Access Network (RAN) in Radio Resource Control (RRC) inactive state.

According to one aspect of the present disclosure, a method of paging policy differentiation at an AMF in a Fifth Generation (5G) telecommunications network comprises: receiving, from a SMF, QoS Information (QoSI); in response to receiving the QoSI from the SMF, determining whether a paging policy selection should be performed by the AMF or by a RAN that serves a target User Equipment (UE); in response to determining that the paging policy selection should be performed by the AMF, performing the paging policy selection based at least on the QoSI, and sending a paging message to the RAN according to the selected paging policy; and in response to determining that the paging policy selection should be performed by the RAN, providing paging policy information to the RAN.

In some embodiments, the QoSI comprises a QFI.

In some embodiments, receiving the QoSI comprises receiving the QoSI in an N11 message.

In some embodiments, determining whether the paging policy selection should be performed by the AMF or by the RAN comprises: determining whether the target UE is in a CM-CONNECTED RRC-IDLE state; in response to determining that the target UE is in the CM-CONNECTED, RRC-IDLE state, determining that the paging policy selection should be performed by the RAN; and in response to determining that the target UE is not in the CM-CONNECTED, RRC-IDLE state, determining that the paging policy selection should be performed by the AMF.

In some embodiments, performing the paging policy selection by the AMF comprises: using the received QoSI to determine a 5G QoS Indicator (5QI) value and an Allocation and Retention Priority (ARP) value; and selecting the paging policy based on the 5QI and ARP values.

In some embodiments, the paging policy is selected based also on at least one of: a Data Network Name (DNN); a Protocol Data Unit (PDU) session Identifier; and a local configuration.

In some embodiments, performing the paging policy selection by the AMF comprises selecting the paging policy per International Mobile Subscriber Identity (IMSI) based on at least one of: the QoSI; the DNN; the PDU session identifier; and a mobility pattern.

In some embodiments, the paging policy comprises a network operator defined profile.

In some embodiments, the network operator defined profile defines at least one of: a paging scope; a waiting time; and a paging repetition logic.

In some embodiments, performing the paging policy selection by the AMF comprises using a value of the QoSI as an index into a table or set of rules for selecting a paging policy.

In some embodiments, the paging policy comprises a paging profile and a paging priority.

In some embodiments, providing paging policy information to the RAN comprises sending, to the RAN, an N2 request message comprising the paging policy information.

In some embodiments, the paging policy information comprises at least one of: the QoSI; and paging priority information.

According to another aspect of the present disclosure, a method of paging policy differentiation at a SMF in a 5G telecommunications network comprises: receiving, from a UPF, a data notification comprising QoSI; and in response to receiving the data notification from the UPF, providing the QoSI to an AMF.

According to another aspect of the present disclosure, a method of paging policy differentiation at a RAN in a 5G telecommunications network comprises: in response to receiving, from an AMF, a paging message for paging a target UE, paging the target UE; and in response to receiving, from the AMF, paging policy information for the target UE, performing a paging policy selection based at least on the received paging policy information, and paging the target UE according to the selected paging policy.

In some embodiments, performing the paging policy selection based at least on the received paging policy information by the RAN comprises using the paging policy information as an input into a table or set of rules for selecting a paging policy.

According to another aspect of the present disclosure, a method of paging policy differentiation at a UPF in a 5G telecommunications network comprises: receiving downlink data for a target UE; and in response to receiving the downlink data, providing a data notification to a SMF, the data notification comprising QoSI.

According to another aspect of the present disclosure, a method of paging policy differentiation in a 5G telecommunications network comprises: at a UPF: receiving downlink data for a target UE; and in response to receiving the downlink data, providing a data notification to a SMF, the data notification comprising QoSI; at the SMF: in response to receiving the data notification from the UPF, providing the QoSI to an AMF; at the AMF: in response to receiving the QoSI from the SMF, determining whether a paging policy selection should be performed by the AMF or by a RAN that serves a target UE; in response to determining that the paging policy selection should be performed by the AMF, performing the paging policy selection based at least on the QoSI, and sending a paging message to the RAN according to the selected paging policy; and in response to determining that the paging policy selection should be performed by the RAN, providing paging policy information to the RAN; and at the RAN: in response to receiving the paging message from the AMF, paging the target UE; and in response to receiving paging policy information from the AMF, performing the paging policy selection based at least on the received paging policy information and paging the target UE according to the selected paging policy.

According to another aspect of the present disclosure, an AMF in a 5G telecommunications network comprises: one or more processors; and memory storing instructions executable by the one or more processors, whereby the AMF is operable to: receive, from a SMF, QoSI; in response to receiving the QoSI from the SMF, determine whether a paging policy selection should be performed by the AMF or by a RAN that serves a target UE; in response to determining that the paging policy selection should be performed by the AMF, perform the paging policy selection based at least on the QoSI, and send a paging message to the RAN according to the selected paging policy; and in response to determining that the paging policy selection should be performed by the RAN, provide paging policy information to the RAN.

In some embodiments, the QoSI comprises a QoS Flow Indicator, QFI.

In some embodiments, receiving the QoSI comprises receiving the QoSI in an N11 message.

In some embodiments, determining whether the paging policy selection should be performed by the AMF or by the RAN comprises: determining whether the target UE is in a Connection Management (CM) Connected, RRC Idle state; in response to determining that the target UE is in the CM-Connected, RRC-Idle state, determining that the paging policy selection should be performed by the RAN; and in response to determining that the target UE is not in the CM-Connected, RRC-Idle state, determining that the paging policy selection should be performed by the AMF.

In some embodiments, performing the paging policy selection by the AMF comprises: using the received QoSI to determine a 5QI, value and an ARP value; and selecting a paging policy based on the 5QI and ARP values.

In some embodiments, the paging policy is selected based also on at least one of: a DNN; a PDU session Identifier; and a local configuration.

In some embodiments, performing the paging policy selection by the AMF comprises selecting the paging policy per IMSI based on at least one of: the QoSI; the DNN; the PDU session identifier; and a mobility pattern.

In some embodiments, the paging policy comprises a network operator defined profile.

In some embodiments, the network operator defined profile defines at least one of: a paging scope; a waiting time; and a paging repetition logic.

In some embodiments, performing the paging policy selection by the AMF comprises using a value of the QoSI as an index into a table or set of rules for selecting a paging policy.

In some embodiments, the paging policy comprises a paging profile and a paging priority.

In some embodiments, providing the paging policy information to the RAN comprises sending, to the RAN, an N2 request message comprising the paging policy information.

In some embodiments, the paging policy information comprises at least one of: the QoSI; and paging priority information.

According to another aspect of the present disclosure, an AMF in a 5G telecommunications network is adapted to: receive, from a SMF, QoSI; in response to receiving the QoSI from the SMF, determine whether a paging policy selection should be performed by the AMF or by a RAN that serves a target UE; in response to determining that the paging policy selection should be performed by the AMF, perform the paging policy selection based at least on the QoSI, and send a paging message to the RAN according to the selected paging policy; and in response to determining that the paging policy selection should be performed by the RAN, provide paging policy information to the RAN.

In some embodiments, the AMF is further adapted to operate according to the method of any of the embodiments described herein.

According to another aspect of the present disclosure, an AMF in a 5G telecommunications network comprises one or more modules whereby the AMF is adapted to: receive, from a SMF, QoSI; in response to receiving the QoSI from the SMF, determine whether a paging policy selection should be performed by the AMF or by a RAN that serves a target UE; in response to determining that the paging policy selection should be performed by the AMF, perform the paging policy selection based at least on the QoSI, and send a paging message to the RAN according to the selected paging policy; and in response to determining that the paging policy selection should be performed by the RAN, provide paging policy information to the RAN.

In some embodiments, the AMF is further adapted to operate according to the method of any of the embodiments described herein.

According to another aspect of the present disclosure, a non-transitory computer readable medium stores software instructions that, when executed by one or more processors of an AMF in a 5G telecommunications network cause the AMF to: receive, from a SMF, QoSI; in response to receiving the QoSI from the SMF, determine whether a paging policy selection should be performed by the AMF or by a RAN that serves a target UE; in response to determining that the paging policy selection should be performed by the AMF, perform the paging policy selection based at least on the QoSI, and send a paging message to the RAN according to the selected paging policy; and in response to determining that the paging policy selection should be performed by the RAN, provide paging policy information to the RAN.

In some embodiments, the instructions executed by the one or more processors cause the AMF to operate according to the method of any of the embodiments described herein.

According to another aspect of the present disclosure, an AMF in a 5G telecommunications network comprises: means for receiving, from a SMF, QoSI; means for, in response to receiving the QoSI from the SMF, determining whether a paging policy selection should be performed by the AMF or by a RAN that serves a target UE; means for, in response to determining that the paging policy selection should be performed by the AMF, performing the paging policy selection based at least on the QoSI, and sending a paging message to the RAN according to the selected paging policy; and means for, in response to determining that the paging policy selection should be performed by the RAN, providing paging policy information to the RAN.

According to another aspect of the present disclosure, a SMF in a 5G telecommunications network comprises: one or more processors; and memory storing instructions executable by the one or more processors, whereby the SMF is operable to: receive, from a UPF, a data notification comprising QoSI; and in response to receiving the data notification from the UPF, provide the QoSI to an AMF.

In some embodiments, the QoSI comprises a QFI.

According to another aspect of the present disclosure, a SMF in a 5G telecommunications network is adapted to: receive, from a UPF, a data notification comprising QoSI; and in response to receiving the data notification from the UPF, provide the QoSI to an AMF.

In some embodiments, the QoSI comprises a QFI.

According to another aspect of the present disclosure, a SMF in a 5G telecommunications network comprises one or more modules whereby the SMF is adapted to: receive, from a UPF, a data notification comprising QoSI; and in response to receiving the data notification from the UPF, provide the QoSI to an AMF.

In some embodiments, the QoSI comprises a QFI.

According to another aspect of the present disclosure, a non-transitory computer readable medium stores software instructions that, when executed by one or more processors of a SMF in a 5G telecommunications network cause the SMF to: receive, from a UPF, a data notification comprising QoSI; and in response to receiving the data notification from the UPF, provide the QoSI to an AMF.

According to another aspect of the present disclosure, a SMF in a 5G telecommunications network comprises: means for receiving, from a UPF, a data notification comprising QoSI; and means for, in response to receiving the data notification from the UPF, providing the QoSI to an AMF.

According to another aspect of the present disclosure, a RAN in a 5G telecommunications network comprises: one or more processors; and memory storing instructions executable by the one or more processors, whereby the RAN is operable to: in response to receiving, from an AMF a paging message for paging a target UE page the target UE; and in response to receiving, from the AMF, paging policy information for the target UE, perform a paging policy selection based at least on the received paging policy information, and page the target UE according to the selected paging policy.

In some embodiments, performing the paging policy selection based at least on the received paging policy information by the RAN comprises using the paging policy information as an input into a table or set of rules for selecting a paging policy.

According to another aspect of the present disclosure, a RAN in a 5G telecommunications network is adapted to: in response to receiving, from an AMF a paging message for paging a target UE, page the target UE; and in response to receiving, from the AMF, paging policy information for the target UE, perform a paging policy selection based at least on the received paging policy information, and page the target UE according to the selected paging policy.

In some embodiments, performing the paging policy selection based at least on the received paging policy information by the RAN comprises using the paging policy information as an input into a table or set of rules for selecting a paging policy.

According to another aspect of the present disclosure, a RAN in a 5G telecommunications network comprises one or more modules whereby the RAN is adapted to: in response to receiving, from an AMF a paging message for paging a target UE, paging the target UE; and in response to receiving, from the AMF, paging policy information for the target UE, perform a paging policy selection based at least on the received paging policy information, and page the target UE according to the selected paging policy.

In some embodiments, performing the paging policy selection based at least on the received paging policy information by the RAN comprises using the paging policy information as an input into a table or set of rules for selecting a paging policy.

According to another aspect of the present disclosure, a non-transitory computer readable medium stores software instructions that, when executed by one or more processors of a RAN in a 5G telecommunications network cause the RAN to: in response to receiving, from an AMF, a paging message for paging a target UE, page the target UE; and in response to receiving, from the AMF, paging policy information for the target UE, perform a paging policy selection based at least on the received paging policy information, and page the target UE according to the selected paging policy.

According to another aspect of the present disclosure, a RAN in a 5G telecommunications network comprises: means for, in response to receiving, from an AMF, a paging message for paging a target UE, paging the target UE; and means for, in response to receiving, from the AMF, paging policy information for the target UE, performing a paging policy selection based at least on the received paging policy information, and paging the target UE according to the selected paging policy.

According to another aspect of the present disclosure, a UPF in a 5G telecommunications network comprises: one or more processors; and memory storing instructions executable by the one or more processors, whereby the UPF is operable to: receive downlink data for a target UE; and in response to receiving the downlink data, provide a data notification to a SMF, the data notification comprising QoSI.

In some embodiments, the QoSI comprises a QFI.

According to another aspect of the present disclosure, a UPF in a 5G telecommunications network is adapted to: receive downlink data for a target UE; and in response to receiving the downlink data, provide a data notification to a SMF, the data notification comprising QoSI.

In some embodiments, the QoSI comprises a QFI.

According to another aspect of the present disclosure, a UPF in a 5G telecommunications network comprises one or more modules, whereby the UPF is adapted to: receive downlink data for a target UE; and in response to receiving the downlink data, provide a data notification to a SMF, the data notification comprising QoSI.

In some embodiments, the QoSI comprises a QFI.

According to another aspect of the present disclosure, a non-transitory computer readable medium stores software instructions that, when executed by one or more processors of a UPF in a 5G telecommunications network cause the UPF to: receive downlink data for a target UE; and in response to receiving the downlink data, provide a data notification to a SMF, the data notification comprising QoSI.

According to another aspect of the present disclosure, a UPF in a 5G telecommunications network comprises: means for receiving downlink data for a target UE; and means for, in response to receiving the downlink data, providing a data notification to a SMF, the data notification comprising QoSI.

According to another aspect of the present disclosure, a network node for performing paging policy differentiation in a 5G telecommunications network comprises: at least one processor; and memory comprising instructions executable by the at least one processor whereby the node is adapted to operate according to any of the methods described herein.

According to another aspect of the present disclosure, a network node for performing paging policy differentiation in a 5G telecommunications network is adapted to operate according to any of the methods described herein.

According to another aspect of the present disclosure, a network node for performing paging policy differentiation in a 5G telecommunications network comprises: one or more modules whereby the node is adapted to operate according to any of the methods described herein.

According to another aspect of the present disclosure, a computer program comprises instructions that, when executed by at least one processor, carry out any of the methods described herein.

According to another aspect of the present disclosure, a carrier comprises the computer program described above, wherein the carrier is one of an electrical signal, an optical signal, a radio signal, or a computer readable storage medium.

According to another aspect of the present disclosure, a 5G telecommunications network for paging policy differentiation comprises: a UPF that receives downlink data for a target UE; and, in response to receiving the downlink data, provides a data notification to a SMF, the data notification comprising QoSI; an SMF that, in response to receiving the data notification from the UPF, provides the QoSI, to an AMF; an AMF that, in response to receiving the QoSI from the SMF: determines whether a paging policy selection should be performed by the AMF or by a RAN that serves the target UE; in response to determining that the paging policy selection should be performed by the AMF, performs the paging policy selection based at least on the QoSI, and sends the paging message to the RAN according to the selected paging policy; and, in response to determining that the paging policy selection should be performed by the RAN, provides paging policy information to the RAN; and a RAN that, in response to receiving the paging message from the AMF, pages the target UE; and that, in response to receiving the paging policy information from the AMF, performs the paging policy selection based at least on the received paging policy information and pages the target UE according to the selected paging policy.

Advantages of the proposed solution include that it provides a simple way of carrying paging policy differentiation information and that the RAN is enabled to make paging policy differentiation for Mobile Terminated (MT) signaling without knowing the content of the upper layer MT signaling.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1A:
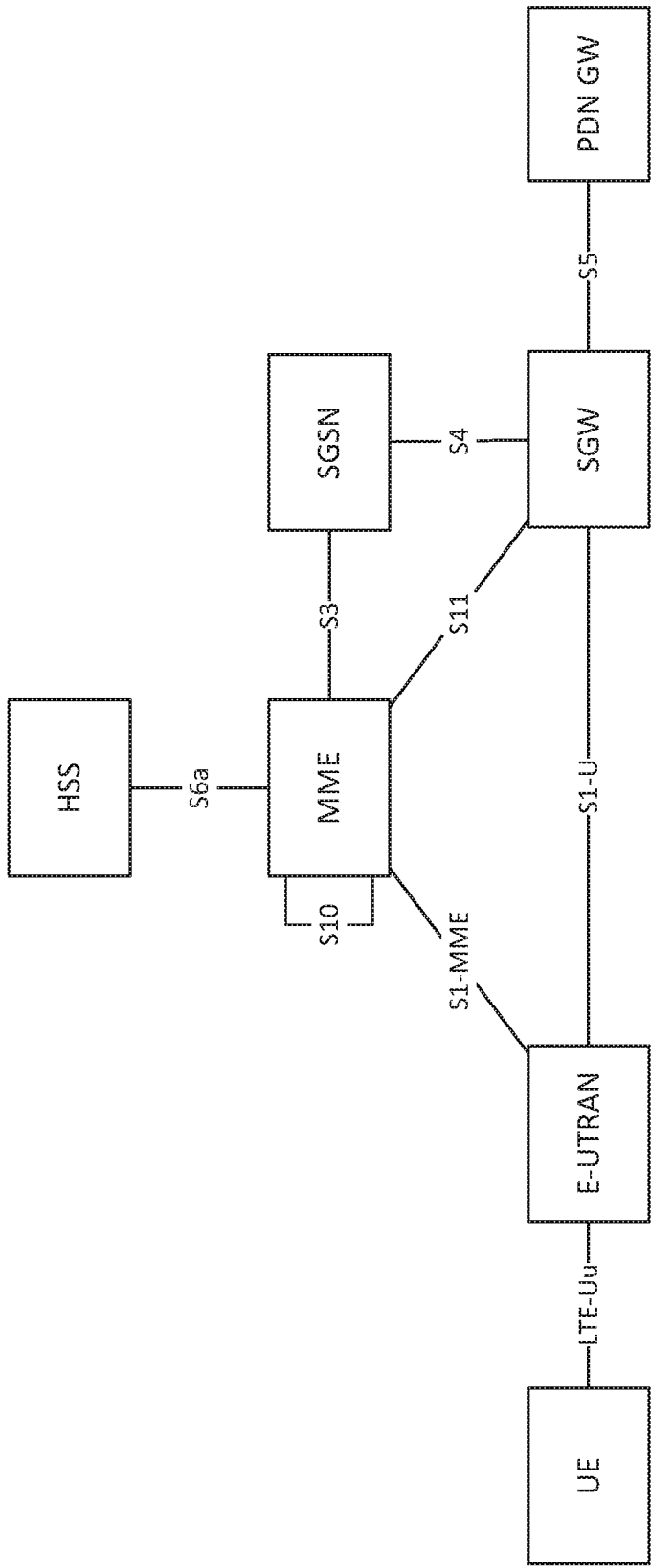
FIG. 1A illustrates some of the functional blocks within a conventional Evolved Packet System (EPS) network architecture and the named interfaces between them.

The subject matter of the present disclosure is directed to delivery of paging policy differentiation information between User Plane Function (UPF)/Session Management Function (SMF) and Authentication Management Function (AMF) and presents a new way of providing paging policy differentiation information to a Radio Access Network (RAN) in Radio Resource Control (RRC) inactive state.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a RAN of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an Enhanced or Evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Network Triggered Service Request—5G

Figure 1B:
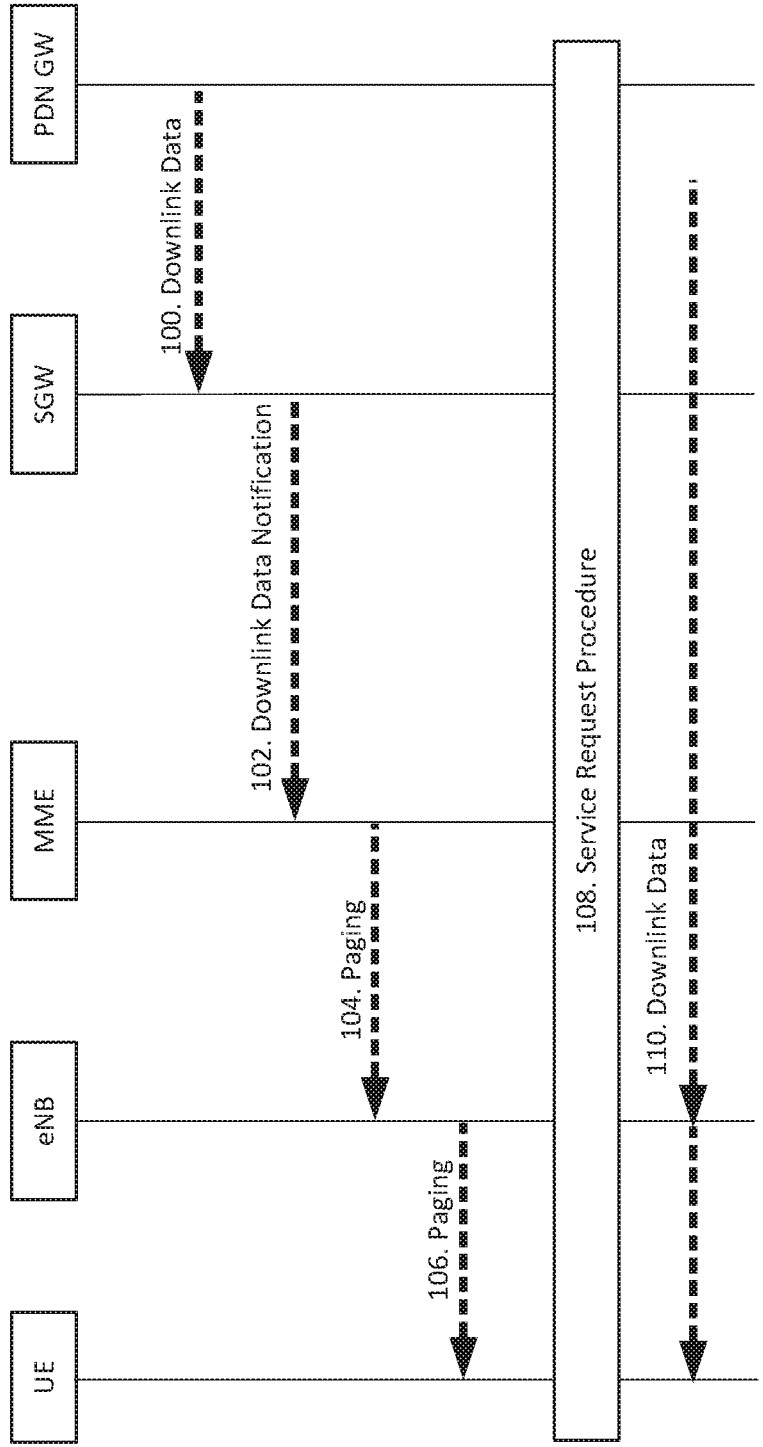
FIG. 1B illustrates a conventional EPS network triggered service request process.
Figure 1C:
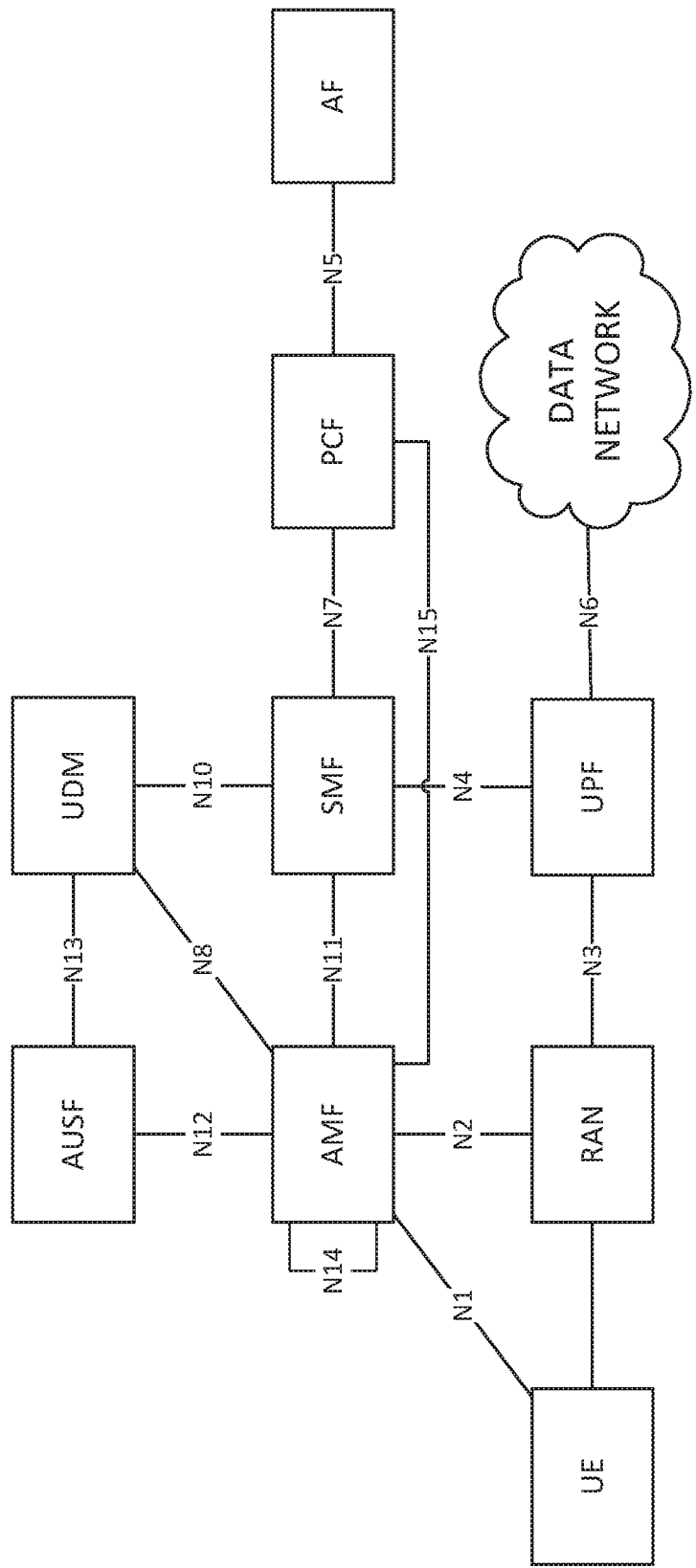
FIG. 1C illustrates some of the functional blocks within a conventional Fifth Generation (5G) network architecture and the named interfaces between them.

As mentioned above, FIG. 1C illustrates some of the functional blocks within a 5G network architecture and the named interfaces between them. FIG. 1C includes an Authentication Server Function (AUSF), a Unified Data Management (UDM) block, a Core Access and AMF, a SMF, a Policy Control Function (PCF), an Application Function (AF), a UE, a (Radio) Access Network ((R)AN), a UPF, and a Data Network (DN). For simplicity, the (R)AN will be hereinafter referred to as "the RAN." The named interfaces are logical connections between entities.

Unlike the Evolved Packet System (EPS) system, where the paging policy differentiation is handled by one entity, the MME, the 5G system scatters that responsibility among the UPF, the SMF, and the AMF. This is described in detail in Technical Specification (TS) 23.502, clause 4.2.3.4 Network triggered service request, and will be discussed below.

The network triggered service request is used when the network needs to signal a UE (e.g., N1 signaling to the UE, Mobile-Terminated Short Message Service (MT-SMS), Protocol Data Unit (PDU) session User Plane (UP) resource establishment to deliver mobile terminating user data). If the UE is in the Connection Management Idle (CM-IDLE) state or the Connection Management Connected (CM-CONNECTED) state, the network initiates a network triggered Service Request procedure.

Figure 2:
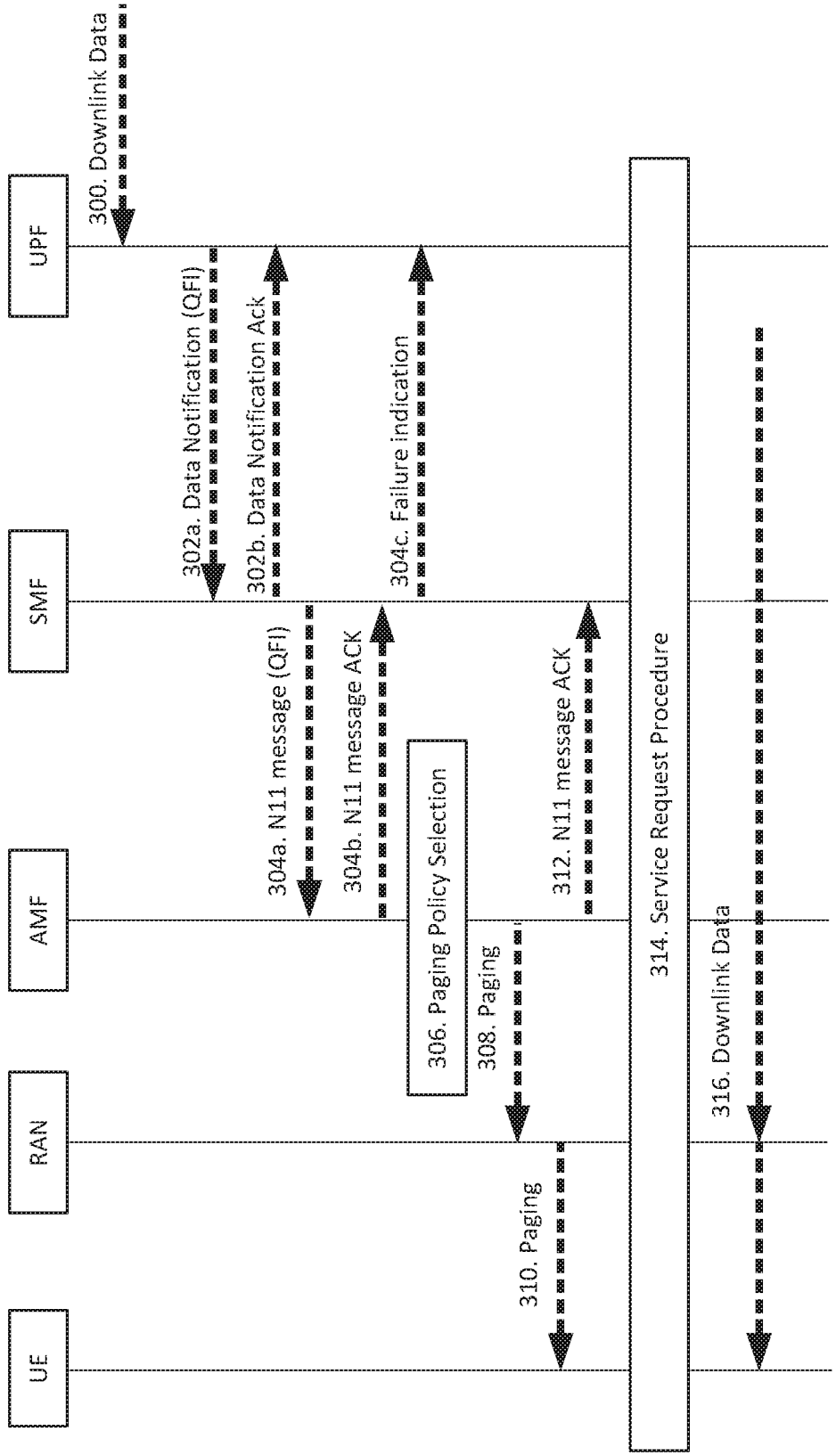
FIG. 2 illustrates an improved 5G paging procedure according to an embodiment of the present disclosure.

If the UE is in CM-IDLE state, and Asynchronous Communication is not activated, the network sends a Paging Request to the RAN/UE. The Paging Request triggers the Service Request procedure in the UE. If Asynchronous Communication is activated, the network suspends the Service Request procedure with the RAN/UE, and continues the Service Request procedure with the RAN/UE (i.e., synchronizes the session context with the RAN and the UE) when the UE enters CM-CONNECTED state. This process is illustrated in FIG. 2.

Figure 1D:
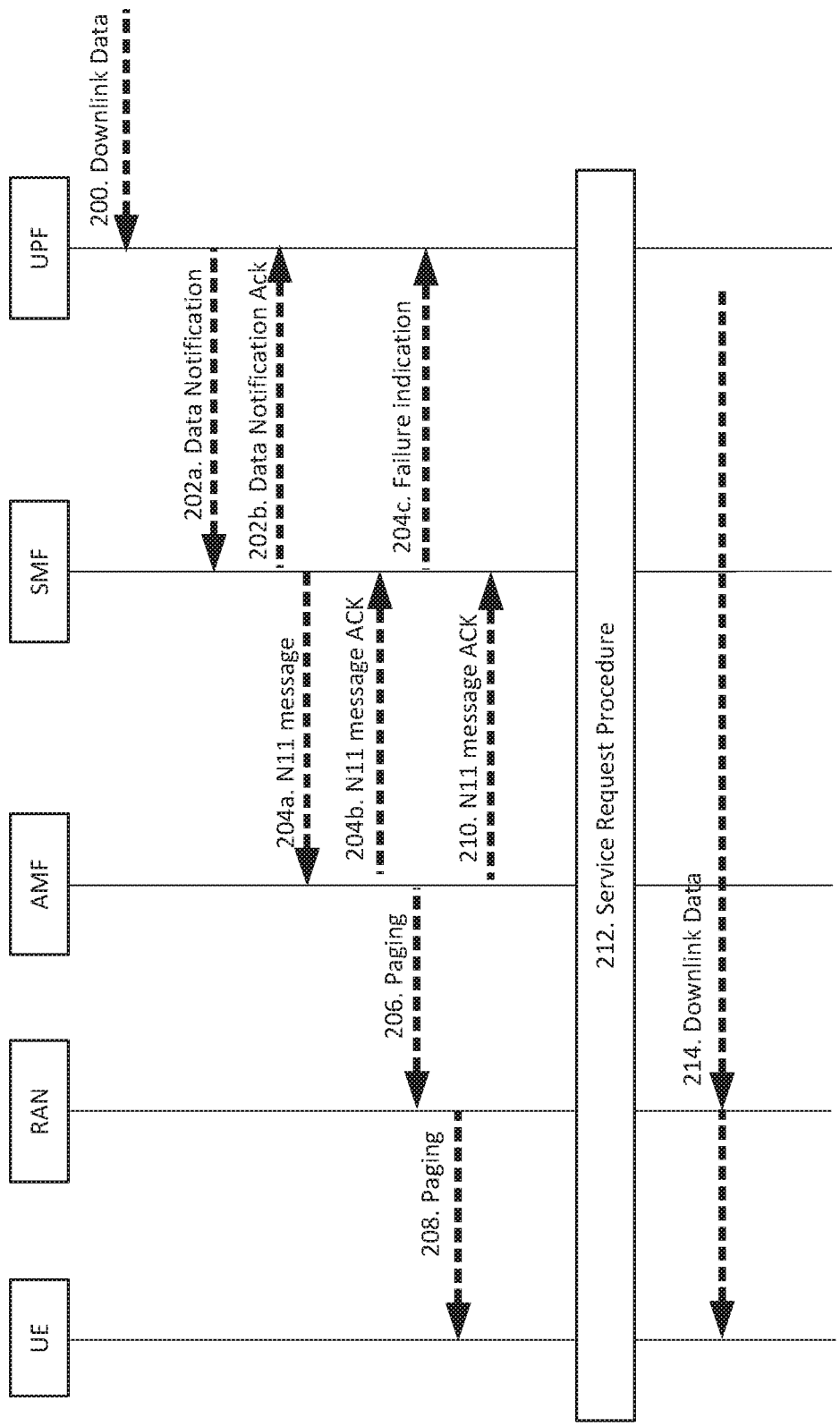
FIG. 1D illustrates a conventional 5G network triggered service request process.

FIG. 1D illustrates a conventional 5G network triggered service request process. The steps of FIG. 1D are described below:

Step 200. When UPF receives downlink data of a PDU session and there is no RAN tunnel information stored in UPF for the PDU session, the UPF buffers the downlink data.

Step 202a. The UPF to the SMF: Data Notification (PDU session Identifier (ID), Priority). On arrival of the first downlink data packet, the UPF shall send a Data Notification message to the SMF. If the UPF receives additional downlink data packets for a Quality of Service (QoS) Flow in the same PDU Session with the same or a lower priority than used in any previous Data Notification for this PDU session, the UPF buffers these downlink data packets without sending a new Data Notification. If the UPF receives additional downlink data packets for a QoS Flow in the same PDU Session with a higher priority than used in any previous Data Notification for this PDU Session, the UPF shall send a Data Notification message to the SMF indicating the higher priority. If the Paging Policy Differentiation feature (as specified in 3GPP TS 23.501, Version 15.0.0, Technical Specification Group Services and System Aspects; System Architecture for the 5G System; Stage 2 (Release 15), hereinafter referred to as "TS 23.501," clause 5.2.X) is supported by the UPF and if it is activated by the SMF for this N4 session, the UPF shall also include the Differentiated Services Code Point (DSCP) in Type of Service (TOS) (IPv4)/Textual Convention (TC) (IPv6) value from the Internet Protocol (IP) header of the downlink data packet.

Step 202b. The SMF to the UPF: Data Notification Acknowledgement (ACK).

Step 204a. The SMF to the AMF: N11 message (UE Permanent ID, PDU session ID, N2 session management information (QoS profile, Core Network (CN) N3 Tunnel Information), Priority). Upon reception of a Data Notification message, the SMF determines the AMF and sends an N11 message (UE Permanent ID, PDU session ID, N2 SM information (QoS profile, CN N3 Tunnel Information), Priority, Paging Policy Indication (PPI)) to the AMF including the Priority and PDU Session ID received in the Data Notification message as part of step 202a. If the SMF, while waiting for the UP Connection (UPC) to be activated, receives any additional Data Notification message for the same PDU session but with higher priority than indicated in any previous Data Notification for this PDU session, the SMF sends a new N11 message indicating the higher priority and PDU Session ID to the AMF. If the SMF, while waiting for the UP to be activated, receives an N11 message response from an AMF other than the one to which the SMF sent an N11 message, the SMF sends the N11 message to this AMF. If the Registration procedure with AMF change is in progress when the old AMF receives a N11 message, the old AMF may reject N11 message with an indication that the N11 message has been temporarily rejected.

When supporting Paging Policy Differentiation, the SMF indicates in the N11 message the PPI related to the downlink data that triggered the Data Notification message, as described in TS 23.501 clause 5.2.X. AMF may receive request message(s) from other network functions which leads to signaling towards UE/RAN, e.g., network initiated detach, SMF initiated PDU session modification. If the UE is in CM-CONNECTED state and the AMF only delivers N1 message towards UE, the flow continues in step 212 below.

Step 204b. [conditional] The AMF responds to the SMF. If the UE is in CM-IDLE state, and the AMF determines that the UE is not reachable for paging, the AMF shall send an N11 message to the SMF, or other network functions from which AMF received the request message in step 204a, indicating the UE is not reachable.

Step 204c. [Conditional] The SMF responds to the UPF. The SMF may notify the UPF about the user plane setup failure.

Step 206. [Conditional] The AMF sends a Paging message to the RAN node. If the UE is in CM-CONNECTED state, the AMF performs some of the steps of the UE triggered Service Request procedure (described in clause 4.2.3.2 of TS 23.502) to activate the UPC for this PDU session (i.e., establish the radio resources and N3 tunnel). The rest of this procedure is omitted.

Step 206. If the UE is in RM-REGISTERED state and CM-IDLE and reachable, the AMF sends a Paging message (Non-Access Stratum (NAS) ID for paging, Registration Area list, Paging Discontinuous Reception (DRX) length, PPI) to the RAN node(s) belonging to the Registration Area(s) in which the UE is registered, see TS [38.331].

Step 208. [Conditional] The RAN node pages the UE. If RAN nodes receive paging messages from the AMF, the UE is paged by the RAN node (see TS 38.331).

Step 210. [Conditional] The AMF to the SMF: N11 message ACK. The AMF supervises the paging procedure with a timer. If the AMF receives no response from the UE to the Paging Request message, the AMF may apply further paging according to any applicable paging strategy described in step 204. If the AMF receives no response from the UE, the AMF considers the UE as unreachable and the SM N2 message cannot be routed to the RAN, so the AMF shall return an "N11 message Reject" with an appropriate "failure cause" (e.g., UE unreachability) to the SMF or other network functions to indicate the failure of "message routing service," unless the AMF is aware of an ongoing Mobility Management (MM) procedure that prevents the UE from responding (i.e., the AMF receives an N14 Context Request message indicating that the UE performs Registration procedure with another AMF). When an "N11 message Reject" is received, SMF informs the UPF.

Step 212. When the UE is in the CM-IDLE state, upon reception of paging request, the UE initiates the UE triggered Service Request procedure (clause 4.2.2.2 of TS 23.502). As part of this procedure, the AMF sends N11 message(s) to the SMF(s) associated with the PDU session identified by PDU session ID(s) in MM NAS Service Request message if there is any, but not to the SMF(s) from which it receives the N11 message in step 204a.

Step 214. The UPF transmits the buffered downlink data toward the UE via the RAN node which performed the Service Request procedure. The network sends downlink signaling if the procedure is triggered due to request from other network entities described in step 204a.

Paging Strategies

When supporting Paging Policy Differentiation, the AMF may include PPI in Paging Request message as described in TS 23.501 clause 5.2.X. Paging strategies may be configured in the AMF for different combinations of Data Network Name (DNN), PPI, PDU Session IDs from the SMF when available (see clause 4.9 of TS 23.501) and other PDU Session context information identified by PDU Session ID received in the N11 message.

Paging strategies may include: paging retransmission scheme (e.g., how frequently the paging is repeated or with what time interval); determining whether to send the Paging message to the RAN nodes during certain AMF high load conditions; whether to apply sub-area based paging (e.g., first page in the last known cell-ID or Timing Advance (TA) and retransmission in all registered TAs).

The AMF and the RAN may support further paging optimizations in order to reduce the signaling load and the network resources used to successfully page a UE by one or several of the following means:
  by the AMF implementing specific paging strategies (e.g., the N2 Paging message is sent to the RAN nodes that served the UE last);
  by the AMF considering information on recommended cells and RAN nodes provided by the RAN at transition to CM-IDLE state. The AMF takes the RAN nodes related part of this information into account to determine the RAN nodes to be paged, and provides the information on recommended cells within the N2 Paging message to each of these RAN nodes;
  by the RAN considering the Paging Attempt Count Information provided by the AMF at paging.

If the UE Radio Capability for Paging Information is available in the AMF, the AMF adds the UE radio capability for paging information in the N2 paging message to the RAN nodes. If the information on recommended cells and RAN nodes for paging is available in the AMF, the AMF shall take that information into account to determine the RAN nodes for paging and, when paging a RAN node, the AMF may transparently convey the information on recommended cells to the RAN node. The AMF may include in the N2 paging message(s) the paging attempt count information. The paging attempt count information shall be the same for all RAN nodes selected by the AMF for paging.

QoS flow in 5G is described in TS 23.501. The QoS flow is the finest granularity of QoS differentiation in the PDU session. A QoS Flow Indicator (QFI) is used to identify a QoS flow in the 5G system. User plane traffic with the same QFI value within a PDU session receives the same traffic forwarding treatment. The QFI is carried in an encapsulation header on N3 (i.e., without any changes to the End-to-End (E2E) packet header). It can be applied to PDUs with different types of payload (i.e., IP packets, non-IP PDUs, and Ethernet frames). The QFI shall be unique within a PDU session. A certain range of QFIs is reserved for A-type QoS flows where the "full" QoS profile will not be used. These QFIs will map directly to standardized 5G QoS Indicators (5QIs) and a default ARP value. Each QoS flow (Guaranteed Bit Rate (GBR) and Non-GBR) is associated with the following QoS parameters (details are described in clause 5.7.2): 5G 5QI and ARP. 5QI is associated with following characteristics: Resource Type (GBR or Non-GBR); Priority level; Packet Delay Budget; and Packet Error Rate. Each GBR QoS flow is in addition associated with the following QoS parameters (details are described in clause 5.7.2): Guaranteed Flow Bit Rate (GFBR)—uplink and downlink; Maximum Flow Bit Rate (MFBR)—uplink and downlink; and Notification control.

Problems with Existing 5G Network Paging Policy Differentiation

There are several problems with the paging policy differentiation as currently defined for 5G networks.

One problem is that the paging differentiation specification in 5G is modeled closely upon the EPS model, but whereas the MME has access to QoS information, the paging policy differentiation execution point in 5G—namely, the Core Access and the AMF—does not. Instead, in the 5G network it is the UPF or the SMF, not the AMF, which has the visibility of PDU session carrying different QoS flows.

Another problem is that 5G introduced the CM-CONNECTED RRC Inactive state and provides that paging shall be carried out by the RAN in this state. This means that, in this state, the AMF is not the paging differentiation execution point and the paging differentiation information needs to be carried all the way to the RAN whenever downlink signaling may trigger RAN paging (e.g., N1 signaling towards a UE or N2 signaling towards the RAN, which will trigger the RAN to invoke the UE).

Yet another problem is that in EPS, the Serving Gateway (SGW) is per UE and is the aggregation point of all PDN connections. The SGW has the responsibility to aggregate the paging differentiation information from multiple PGWs at the same time, and pass it to MME for paging differentiation execution. That is, in EPS, the SGW provides all needed paging differentiation information to the MME for use by the MME during paging differentiation. In 5G, the AMF (like the MME), is still the paging differentiation execution point for a UE in CM-IDLE mode, but the AMF is also the aggregation point of paging differentiation information of all PDU sessions.

Thus, although the AMF (or RAN) are the paging differentiation execution points in 5G, current 5G standards do not specify any mechanism by which the AMF or RAN are provided with QoS information for use for paging differentiation. This despite the fact that, in the EPS systems upon which the current 5G architecture was modeled, the EPS paging differentiation execution point—the MME—is provided with QoS information, which the MME uses to make paging differentiation decisions.

The subject matter of the present disclosure is directed to delivery of paging policy differentiation information between UPF/SMF and AMF using QoS information—e.g., QFI—and presents a new way of providing paging policy differentiation information to a RAN in RRC inactive state.

In some embodiments, the AMF determines whether the paging policy selection should be performed by the AMF or by a RAN that serves the target UE. If the paging policy selection should be performed by the AMF, the AMF selects a paging policy and sends a paging message to the RAN according to the selected paging policy. An example in which the AMF selects a paging policy will be described in detail in FIG. 2, below. If the paging policy selection should be performed by the RAN, the AMF provides paging policy information to the RAN, and the RAN performs a paging policy selection based on the received paging policy information and pages the UE according to the selected paging policy. An example in which the RAN selects a paging policy will be described in detail in FIG. 3, below. In some embodiments, determining whether a paging policy selection should be performed by the AMF or by the RAN comprises determining whether the target UE is in a CM-Connected, RRC-Idle state: if the target UE is in the CM-Connected, RRC-Idle state, the paging policy selection should be performed by the RAN, but if the target UE is not in the CM-Connected, RRC-Idle state, the paging policy selection should be performed by the AMF.

FIG. 2 illustrates an improved 5G paging procedure according to an embodiment of the present disclosure. In the embodiment illustrated in FIG. 2, QoS information is provided by the UPF to the SMF and by the SMF to the AMF. In one embodiment, the QoS information comprises the QFI value, which is a convenient reference for the kind of information needed by the AMF or RAN to make a proper paging differentiation. That is, in one embodiment the QFI is considered as the paging policy information that is transferred from the UPF to the SMF and to the AMF. The steps of FIG. 2 are described below:

Step 300. When the UPF receives downlink data of a PDU session and there is no RAN tunnel information stored in UPF for the PDU session, the UPF buffers the downlink data.

Step 302*a*. UPF to SMF: Data Notification. In the improved process described in FIG. 2, the data notification message contains QFI data. On arrival of the first downlink data packet, the UPF may send a Data Notification message (PDU session ID, Priority, QFI) to the SMF. If the UPF receives additional downlink data packets for a QoS Flow in the same PDU Session with the same or a lower priority than used in any previous Data Notification for this PDU session, the UPF buffers these downlink data packets without sending a new Data Notification. If the UPF receives additional downlink data packets for a QoS Flow in the same PDU Session with a higher priority than used in any previous Data Notification for this PDU Session, the UPF shall send a Data Notification message to the SMF indicating the higher priority. If the Paging Policy Differentiation feature (as specified in TS 23.501, clause 5.2.X) is supported by the UPF and if it is activated by the SMF for this N4 session, the UPF shall also include the DSCP in TOS (IPv4)/TC (IPv6) value from the IP header of the downlink data packet.

Step 302*b*. The SMF to the UPF: Data Notification ACK.

Step 304*a*. The SMF to the AMF: N11 message. In the improved process described herein, this N11 message now contains QFI data. Upon reception of a Data Notification message, the SMF determines the AMF and sends an N11 message (UE Permanent ID, PDU session ID, N2 SM information (QoS profile, CN N3 Tunnel Information), Priority, PPI, QFI) to the AMF including the Priority and PDU Session ID received in the Data Notification message as part of step 302*a*. If the SMF, while waiting for the user plane Connection to be activated, receives any additional Data Notification message for the same PDU session but with higher priority than indicated in any previous Data Notification for this PDU session, the SMF sends a new N11 message indicating the higher priority and PDU Session ID to the AMF. If the SMF, while waiting for the user plane to be activated, receives an N11 message response from an AMF other than the one to which the SMF sent an N11 message, the SMF sends the N11 message to this AMF. If the Registration procedure with AMF change is in progress when the old AMF receives a N11 message, the old AMF may reject N11 message with an indication that the N11 message has been temporarily rejected. When supporting Paging Policy Differentiation, the SMF indicates in the N11 message the PPI related to the downlink data that triggered the Data Notification message, as described in TS 23.501 clause 5.2.X. The AMF may receive request message(s) from other network functions which leads to signaling towards UE/RAN, e.g., network initiated detach, the SMF initiated PDU session modification.

Step 304*b*. [conditional] The AMF responds to the SMF. If the UE is in CM-IDLE state, and the AMF determines that the UE is not reachable for paging, the AMF shall send an N11 message to the SMF, or other network functions from which AMF received the request message in step 304a, indicating the UE is not reachable.

Step 304c. [Conditional] The SMF responds to the UPF. The SMF may notify the UPF about the user plane setup failure.

Step 306. The AMF performs a paging policy differentiation function to select a paging policy. This operation may also be referred to as performing a paging policy selection. In one embodiment, the AMF takes the QFI information into account while performing the paging policy differentiation function. For example, the AMF may use the QFI information to determine a standardized 501 value and a default ARP value. When the AMF receives the QFI or other paging policy information from the SMF or other Network Functions (NFs), the AMF may formulate the paging policy based on this information and other available information, e.g., stored information related to the PDU session such as DNN, PDU session ID, and local configuration. In one embodiment, the AMF may find a paging policy/profile per International Mobile Subscriber Identity (IMSI) number series based on input parameters such as QFI, DNN name, PDU session ID, and mobility pattern. In one embodiment, the paging profile comprises an operator defined profile with paging scope, waiting time, and paging repetition logic. Below is an example of possible paging policy/profile selection logic:

| Selection matching rule | DNN | QFI | Active time | Result | |
|---|---|---|---|---|---|
| 1 | Null | 1-2 | Null | Profile 1 | Paging Priority x |
| 2 | | 3-7 | | Profile 2 | Paging Priority y |
| ... | | | | ... | |
| 100 | Null | Null | Null | Default profile 100 | |

Based on the paging profile selection results, the AMF may perform the paging for UE in CM-IDLE mode by sending "Paging Request" to the RAN in step 308, below, based on the paging scope in the paging profile.

Step 308. [Conditional] The AMF sends Paging message to the RAN node. If the UE is in CM-CONNECTED state, the AMF performs some of the steps of the UE triggered Service Request procedure (TS 23.502, clause 4.2.3.2) to activate the UPC for this PDU session (i.e., establish the radio resources and N3 tunnel). The rest of this procedure is omitted.

Step 308. If the UE is in RM-REGISTERED state and CM-IDLE and reachable, the AMF sends a Paging message (NAS ID for paging, Registration Area list, Paging DRX length, PPI) to the RAN node(s) belonging to the Registration Area(s) in which the UE is registered.

Step 310. [Conditional] The RAN node pages the UE. If RAN nodes receive paging messages from the AMF, the UE is paged by the RAN node, see TS 38.331.

Step 312. [Conditional] The AMF to the SMF: N11 message ACK. The AMF supervises the paging procedure with a timer. If the AMF receives no response from the UE to the Paging Request message, the AMF may apply further paging according to any applicable paging strategy described in step 304. If the AMF receives no response from the UE, the AMF considers the UE as unreachable and the SM N2 message cannot be routed to the RAN, so the AMF shall return an "N11 message Reject" with an appropriate "failure cause" (e.g., UE unreachability) to the SMF or other network functions to indicate the failure of "message routing service," unless the AMF is aware of an ongoing MM procedure that prevents the UE from responding, i.e., the AMF receives an N14 Context Request message indicating that the UE performs Registration procedure with another AMF. When an "N11 message Reject" is received, the SMF informs the UPF.

Step 314. When the UE is in the CM-IDLE state, upon reception of paging request, the UE initiates the UE triggered Service Request procedure (TS 23.502, clause 4.2.2.2). In this procedure, the AMF sends N11 message to the SMF(s) associated with the PDU session identified by PDU session ID(s) in MM NAS Service Request message if there is any, but not to the SMF(s) from which it receives the N11 message in step 304a.

Step 316. The UPF transmits the buffered downlink data toward UE via RAN node which performed the Service Request procedure. The network sends downlink signaling if the procedure is triggered due to request from other network entities.

Where different data flows, e.g., IP Multimedia Subsystem (IMS) Session Initiation Protocol (SIP) signaling and other traffic, are mixed in the same bearer (which may occur where the total number of bearers of a UE is limited to 8, for example), different QFIs can be assigned for these different data flows since the number of available QFIs inside one PDU session is 256.

Figure 3:
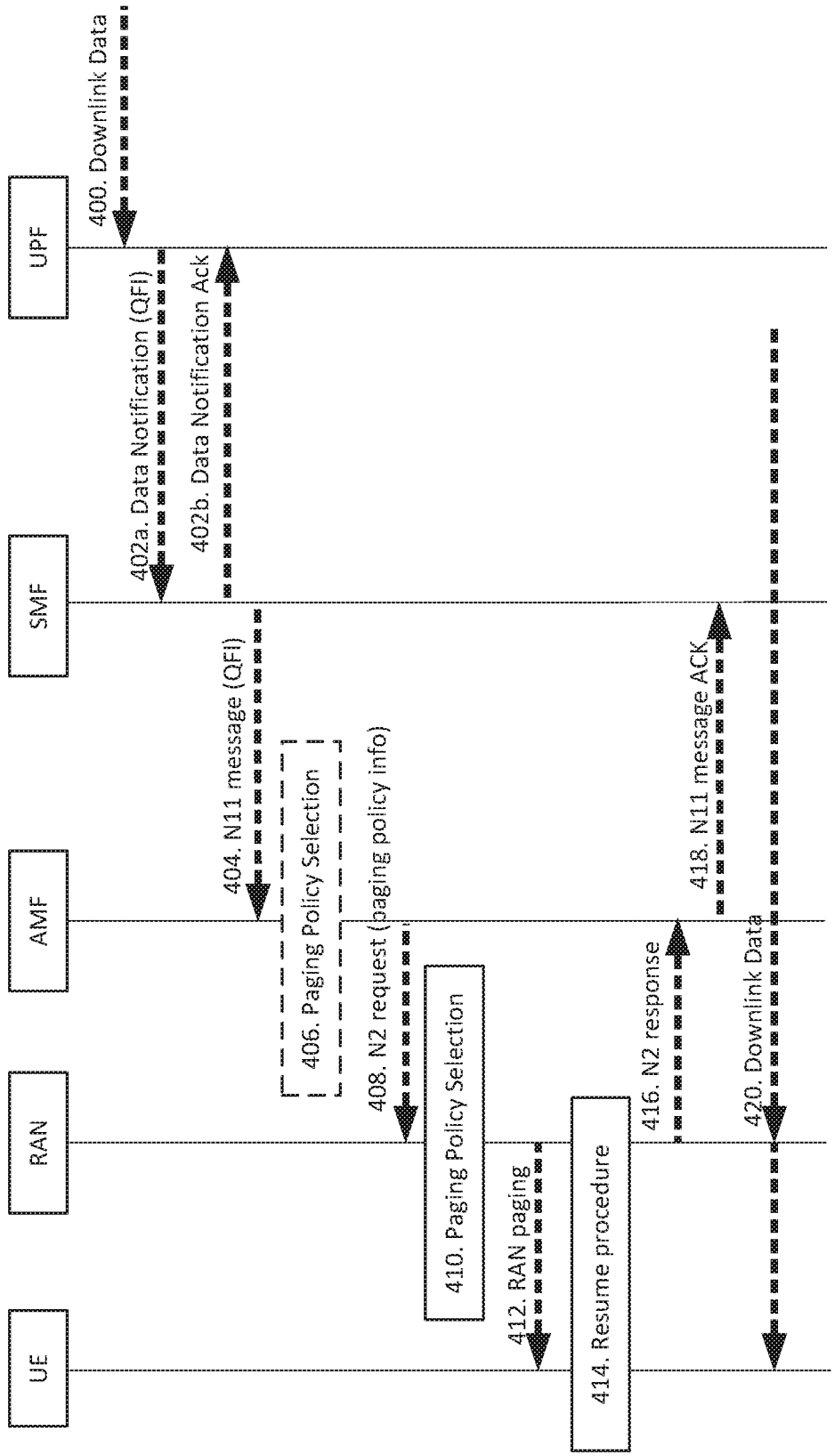
FIG. 3 illustrates an improved 5G paging procedure according to another embodiment of the present disclosure.

FIG. 3 illustrates an improved 5G paging procedure according to another embodiment of the present disclosure. The steps of FIG. 3 are described below:

Step 400. When the UPF receives downlink data of a PDU session and there is no RAN tunnel information stored in the UPF for the PDU session, the UPF buffers the downlink data.

Step 402a. The UPF to the SMF: Data Notification. In the improved process described herein, the data notification message now contains QFI data. On arrival of the first downlink data packet, the UPF shall send a Data Notification message (PDU session ID, Priority, QFI) to the SMF. In one embodiment, if the UPF receives additional downlink data packets for a QoS Flow in the same PDU Session with the same or a lower priority than used in any previous Data Notification for this PDU session, the UPF buffers these downlink data packets without sending a new Data Notification. In one embodiment, if the UPF receives additional downlink data packets for a QoS Flow in the same PDU Session with a higher priority than used in any previous Data Notification for this PDU Session, the UPF shall send a Data Notification message to the SMF indicating the higher priority. In one embodiment, if the Paging Policy Differentiation feature (as specified in TS 23.501 clause 5.2.X) is supported by the UPF and if it is activated by the SMF for this N4 session, the UPF shall also include the DSCP in TOS (IPv4)/TC (IPv6) value from the IP header of the downlink data packet.

Step 402b. The SMF to the UPF: Data Notification ACK.

Step 404. The SMF to the AMF: N11 message. In the improved process described herein, this N11 message now contains QFI data. Upon reception of a Data Notification message, the SMF determines the AMF and sends an N11 message (UE Permanent ID, PDU session ID, N2 SM information (QoS profile, CN N3 Tunnel Information), Priority, PPI, QFI) to the AMF including the Priority and PDU Session ID received in the Data Notification message as part of step 402a. In one embodiment, if the SMF, while waiting for the UPC to be activated, receives any additional Data Notification message for the same PDU session but with higher priority than indicated in any previous Data Notification for this PDU session, the SMF sends a new N11 message indicating the higher priority and PDU Session ID to the AMF. In one embodiment, if the SMF, while waiting for the user plane to be activated, receives an N11 message response from an AMF other than the one to which the SMF sent an N11 message, the SMF sends the N11 message to this AMF. In one embodiment, if the Registration procedure with AMF change is in progress when the old AMF receives a N11 message, the old AMF may reject the N11 message with an indication that the N11 message has been temporarily rejected. When supporting Paging Policy Differentiation, the SMF indicates in the N11 message the PPI related to the downlink data that triggered the Data Notification message, as described in TS 23.501, clause 5.2.X. The AMF may receive request message(s) from other network functions which leads to signaling towards UE/RAN, e.g., network initiated detach, SMF initiated PDU session modification.

Step 406. If the UE is not in the CM-CONNECTED, RRC IDLE state, then the AMF may perform a paging policy selection, such as is described in Step 306 of FIG. 2. In one embodiment, the process continues from Step 306 of FIG. 2 rather than following the process described in FIG. 3. If the UE is in the CM-CONNECTED, RRC IDLE state, however, the process continues with Step 408, below.

Step 408. In the embodiment illustrated in FIG. 3, the AMF sends an N2 request message containing paging policy information to the RAN.

Step 410. In response to receiving the N2 request message in Step 408, the RAN may perform a paging policy selection, such as is described in Step 306 of FIG. 2, using the paging policy information provided by the AMF.

Step 412. The RAN pages the UE.

Step 414. The UE initiates a Resume procedure.

Step 416. The RAN issues a N2 Response to the AMF.

Step 418. The AMF issues a N11 message ACK to the SMF.

Step 420. The UPF transmits the buffered downlink data toward the UE via the RAN node which performed the Resume procedure.

In one embodiment, the AMF also provides paging priority information in the paging request to the RAN. The paging priority either can be part of the paging profile selection logic, or it can be a direct remapping from QFI as independent logic. In one embodiment, if the UE is in CM-CONNECTED RRC inactive state, the RAN may be provided with paging policy information in three different ways. First, the RAN may receive data packet directly from the UPF, where the RAN can, based on the known QFI, decide the paging policy. Second, the RAN may receive an N2 request (e.g., a N3 user plane setup request) from the SMF via the AMF where the SMF may provide the QFI information to the RAN. Third, when the RAN is requested to deliver a Mobile Terminated (MT) N1 message, the RAN may need to receive paging policy information from the AMF. The AMF shall deliver the paging policy information with a similar format as QFI so that the RAN can have a unified handling as the first and second scenario.

Figure 4:
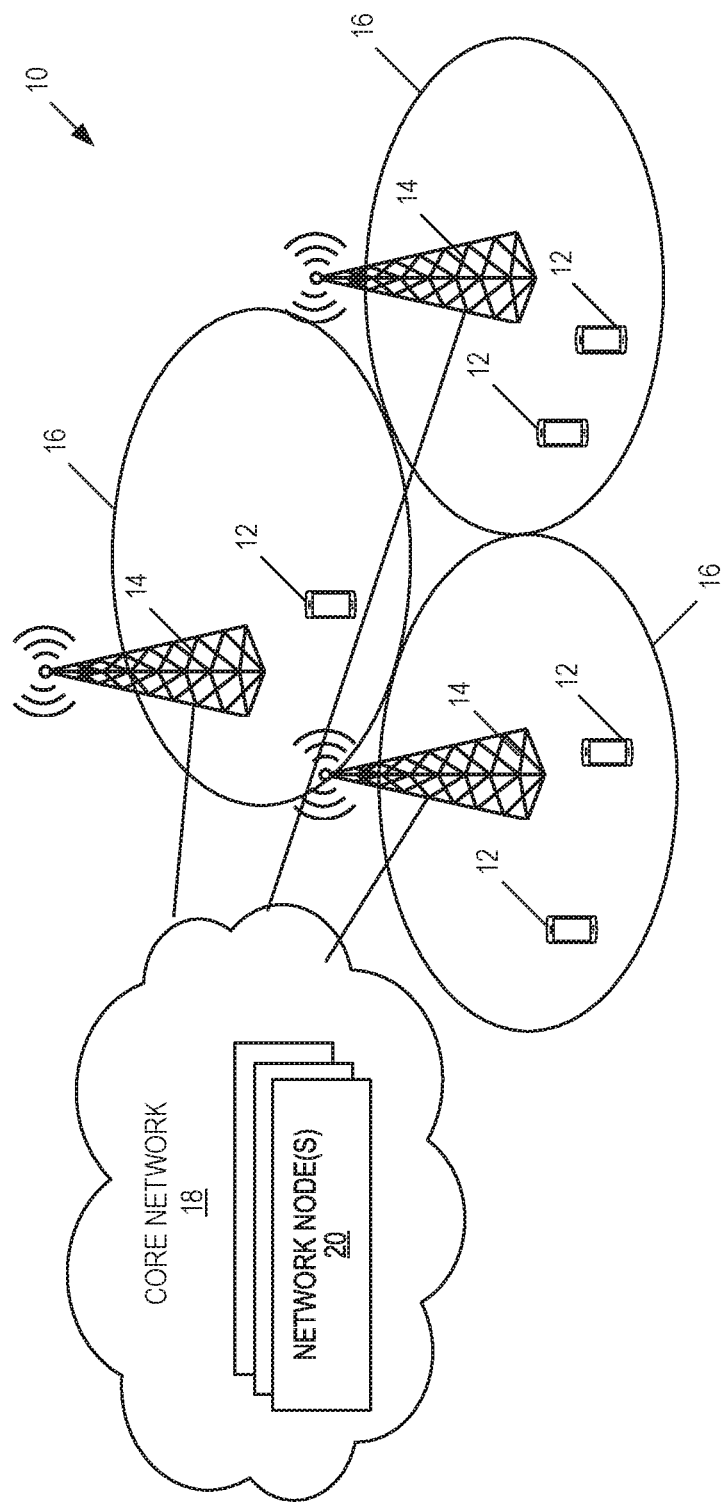
FIG. 4 illustrates one example of a wireless communication system in which embodiments of the present disclosure may be implemented

FIG. 4 illustrates one example of a wireless communication system 10 in which embodiments of the present disclosure may be implemented. The wireless communication system 10 may be a cellular communications system such as, for example, a 5G NR network. As illustrated, in this example, the wireless communication system 10 includes a plurality of wireless communication devices 12 (e.g., conventional UEs, MTC/Machine-to-Machine (M2M) UEs) and a plurality of radio access nodes 14 (e.g., eNBs, 5G base stations which are referred to as gNBs, or other base stations). The wireless communication system 10 is organized into cells 16, which are connected to a core network 18 via the corresponding radio access nodes 14. The radio access nodes 14 are capable of communicating with the wireless communication devices 12 (also referred to herein as wireless devices 12) along with any additional elements suitable to support communication between wireless communication devices or between a wireless communication device and another communication device (such as a landline telephone). The core network 18 includes one or more network node(s) 20. In one embodiment, the network nodes 20 may comprise, for example, any of the Evolved Packet Core (EPC) nodes shown in FIG. 1A and/or any of the nodes shown in FIG. 1B.

Figure 5:
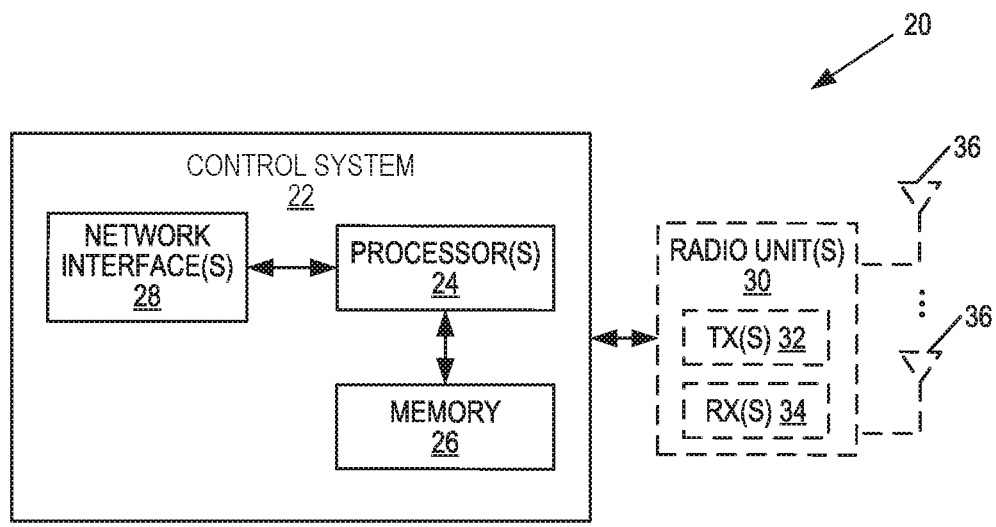
FIG. 5 is a schematic block diagram of a network node (e.g., a User Plane Function (UPF), an Session Management Function (SMF), an Authentication Management Function (AMF), or a Radio Access Network (RAN)) according to some embodiments of the present disclosure.

FIG. 5 is a schematic block diagram of a network node 20 (e.g., a UPF, an SMF, an AMF, or a RAN) according to some embodiments of the present disclosure. As illustrated, the network node 20 includes a control system 22 that includes circuitry comprising one or more processors 24 (e.g., Central Processing Units (CPUs), Application Specific Integrated Circuits (ASICs), Digital Signal Processors (DSPs), Field Programmable Gate Arrays (FPGAs), and/or the like) and memory 26. In the embodiment illustrated in FIG. 5, the control system 22 also includes a network interface 28. In embodiments in which the network node 20 is a RAN, the network node 20 also includes one or more radio units 30 that each include one or more transmitters 32 and one or more receivers 34 coupled to one or more antennas 36. In some embodiments, the functionality of the network node 20 described above may be fully or partially implemented in software that is, e.g., stored in the memory 26 and executed by the processor(s) 24.

Figure 6:
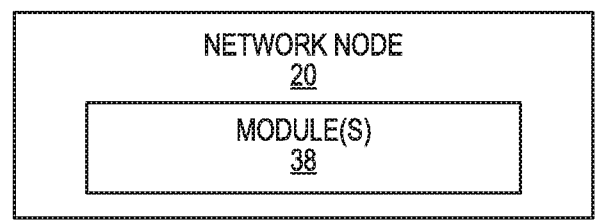
FIG. 6 is a schematic block diagram of a network node (which may be, e.g., a UPF, an SMF, an AMF, or a RAN) according to some other embodiments of the present disclosure.

FIG. 6 is a schematic block diagram of the network node 20 (which may be, e.g., a UPF, an SMF, an AMF, or a RAN) according to some other embodiments of the present disclosure. In the embodiment illustrated in FIG. 6, the network node 20 includes one or more modules 38, each of which is implemented in software. The module(s) 38 provide the functionality of the network node 20 described herein.

Figure 7:
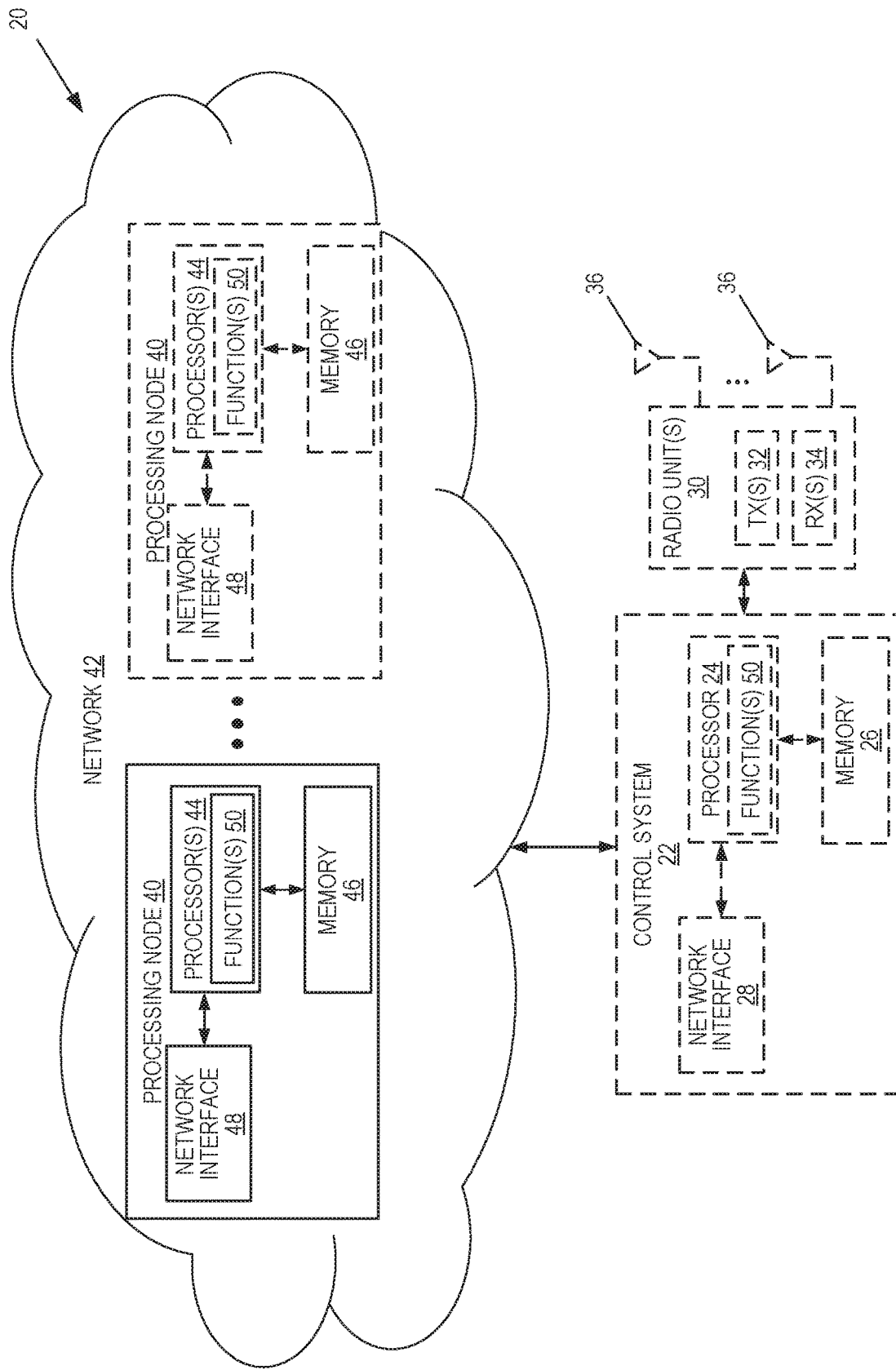
FIG. 7 is a schematic block diagram that illustrates a virtualized embodiment of a network node according to some embodiments of the present disclosure.

FIG. 7 is a schematic block diagram that illustrates a virtualized embodiment of the network node 20 according to some embodiments of the present disclosure. As used herein, a "virtualized" network node is a network node in which at least a portion of the functionality of the network node 20 is implemented as a virtual component (e.g., via a virtual machine(s) executing on a physical processing node(s) in a network(s)). As illustrated, the network node 20 optionally includes the control system 22, as described with respect to FIG. 5. In addition, if the network node 20 is a RAN, the network node 20 may also include the one or more radio units 30, as described with respect to FIG. 5. The control system 22 (if present) is connected to one or more processing nodes 40 coupled to or included as part of a network(s) 42 via the network interface 28. Alternatively, if the control system 22 is not present, the one or more radio units 30 (if present) are connected to the one or more processing nodes 40 via the network interface(s) 28. Alternatively, all of the functionality of the network node 20 described herein may be implemented in the processing nodes 40 (i.e., the network node 20 does not include the control system 22 or the radio unit(s) 30).

In the embodiment illustrated in FIG. 7, each processing node 40 includes one or more processors 44 (e.g., CPUs, ASICs, DSPs, FPGAs, and/or the like), memory 46, and a network interface 48.

In this example, functions 50 of the network node 20 described herein are implemented at the one or more processing nodes 40 or distributed across the control system 22 (if present) and the one or more processing nodes 40 in any desired manner. In some particular embodiments, some or all of the functions 50 of the network node 20 described herein are implemented as virtual components executed by one or more virtual machines implemented in a virtual environment(s) hosted by the processing node(s) 40. As will be appreciated by one of ordinary skill in the art, additional signaling or communication between the processing node(s) 40 and the control system 22 (if present) or alternatively the radio unit(s) 30 (if present) is used in order to carry out at least some of the desired functions. Notably, in some embodiments, the control system 22 may not be included, in which case the radio unit(s) 30 (if present) communicates directly with the processing node(s) 40 via an appropriate network interface(s).

In some particular embodiments, higher layer functionality (e.g., layer 3 and up and possibly some of layer 2 of the protocol stack) of the network node 20 may be implemented at the processing node(s) 40 as virtual components (i.e., implemented "in the cloud") whereas lower layer functionality (e.g., layer 1 and possibly some of layer 2 of the protocol stack) may be implemented in the radio unit(s) 30 and possibly the control system 22.

In some embodiments, a computer program including instructions which, when executed by the at least one processor 24, 44 causes the at least one processor 24, 44 to carry out the functionality of the network node 20 or a processing node 40 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 26, 46).

Example Embodiments

While not being limited thereto, some example embodiments of the present disclosure are provided below.

Embodiment 1: A method of paging policy differentiation in a 5G telecommunications network, the method comprising: at a UPF: receiving downlink data for a target UE; and in response to receiving the downlink data, providing a data notification to a SMF, the data notification comprising a QoS indicator; at the SMF: in response to receiving the data notification from the UPF, providing the QoS indicator to an AMF; at the AMF: in response to receiving the QoS indicator from the SMF, determining whether a paging policy selection should be performed by the AMF or by a RAN that serves the target UE; in response to determining that the paging policy selection should be performed by the AMF, using the QoS indicator to identify QoS information, performing a paging policy selection based at least on the identified QoS information, and sending a paging message to the RAN according to the selected paging policy; and in response to determining that the paging policy selection should be performed by the RAN, providing paging policy information to the RAN; and, at the RAN: in response to receiving a paging message from the AMF, paging the target UE; and in response to receiving paging policy information from the AMF, performing a paging policy selection based at least on the received paging policy information and paging the UE according to the selected paging policy.

Embodiment 2: The method of embodiment 1 wherein the QoS indicator comprises a QFI.

Embodiment 3: The method of embodiment 1 wherein proving the QoS indicator to the AMF comprises sending the QoS indicator in an N11 message.

Embodiment 4: The method of embodiment 1 wherein determining whether a paging policy selection should be performed by the AMF or by the RAN comprises: determining whether the target UE is in a CM-Connected, RRC-Idle state; in response to determining that the target UE is in the CM-Connected, RRC-Idle state, determining that the paging policy selection should be performed by the RAN; and in response to determining that the target UE is not in the CM-Connected, RRC-Idle state, determining that the paging policy selection should be performed by the AMF.

Embodiment 5: The method of embodiment 1 wherein performing the paging policy selection by the AMF comprises: using the received QFI to determine a 5QI value and an ARP value; and determining a paging policy based on the 5QI and ARP values.

Embodiment 6: The method of embodiment 5 wherein the paging policy is determined based also on at least one of: a DNN; a PDU session Identifier; and a local configuration.

Embodiment 7: The method of embodiment 6 wherein performing the paging policy selection by the AMF comprises determining a paging policy per IMSI, based on at least one of: the QFI; the DNN; the PDU session identifier; and a mobility pattern.

Embodiment 8: The method of embodiment 1 wherein the paging policy comprises a network operator defined profile.

Embodiment 9: The method of embodiment 8 wherein the network operator defined profile defines at least one of: a paging scope; a waiting time; and a paging repetition logic.

Embodiment 10: The method of embodiment 1 wherein performing the paging policy selection by the AMF comprises using a value of the QFI as an index into a table or set of rules for selecting a paging policy.

Embodiment 11: The method of embodiment 1 wherein a paging policy comprises a paging profile and a paging priority.

Embodiment 12: The method of embodiment 1 wherein providing paging policy information to the RAN comprises sending, to the RAN, an N2 request message comprising the paging policy information.

Embodiment 13: The method of embodiment 12 wherein the paging policy information comprises at least one of: the QFI; and paging priority information.

Embodiment 14: The method of embodiment 12 wherein performing a paging policy selection based at least on the received paging policy information by the RAN comprises using the paging policy information as an input into a table or set of rules for selecting a paging policy.

Embodiment 15: A method of paging policy differentiation in a 5G telecommunications network, the method comprising: at a UPF: receiving downlink data for a target UE; and, in response to receiving the downlink data, providing a data notification to a SMF, the data notification comprising a QoS, indicator.

Embodiment 16: A method of paging policy differentiation in a 5G telecommunications network, the method comprising: at a SMF: receiving, from a UPF, a data notification comprising a QoS indicator; and in response to receiving the data notification from the UPF, providing the QoS indicator to an AMF.

Embodiment 17: A method of paging policy differentiation in a 5G telecommunications network, the method comprising: at an AMF: receiving, from a SMF, a QoS indicator;

in response to receiving the QoS indicator from the SMF, determining whether a paging policy selection should be performed by the AMF or by a RAN that serves the target UE; in response to determining that the paging policy selection should be performed by the AMF, using the QoS indicator to identify QoS information, performing a paging policy selection based at least on the identified QoS information, and sending a paging message to the RAN according to the selected paging policy; and in response to determining that the paging policy selection should be performed by the RAN, providing paging policy information to the RAN.

Embodiment 18: A method of paging policy differentiation in a 5G telecommunications network, the method comprising: at the RAN: in response to receiving, from an AMF, a paging message for paging a target UE, paging the target UE; and in response to receiving, from the AMF, paging policy information for the target UE, performing a paging policy selection based at least on the received paging policy information, and paging the UE according to the selected paging policy.

Embodiment 19: A network node for performing paging policy differentiation in a 5G telecommunications network, the network node adapted to operate according to the method of any of embodiments 1 to 18.

Embodiment 20: A network node for performing paging policy differentiation in a 5G telecommunications network, the network node comprising: at least one processor; and memory comprising instructions executable by the at least one processor whereby the node is adapted to operate according to the method of any of embodiments 1 to 18.

Embodiment 21: A network node for performing paging policy differentiation in a 5G telecommunications network, the network node comprising: one or more modules whereby the node is adapted to operated according to the method of any of embodiments 1 to 18.

The following acronyms are used throughout this disclosure.

3GPP Third Generation Partnership Project
5G Fifth Generation
5QI Fifth Generation Quality of Service Indicator
ACK Acknowledgement
AF Application Function
AMF Authentication Management Function
AN Access Network
ARP Allocation and Retention Priority
ASIC Application Specific Integrated Circuit
AUSF Authentication Server Function
CM Connection Management
CN Core Network
CPU Central Processing Unit
DDN Downlink Data Notification
DN Data Network
DNN Data Network Name
DRX Discontinuous Reception
DSCP Differentiated Services Code Point
DSP Digital Signal Processor
E2E End-to-End
EBI Evolved Packet System Bearer Identifier
eNB Evolved or Enhanced Node B
EPC Evolved Packet Core
EPS Evolved Packet System
E-UTRAN Evolved Universal Terrestrial Radio Access Network
FPGA Field Programmable Gate Array
GBR Guaranteed Bit Rate
GFBR Guaranteed Flow Bit Rate
gNB New Radio Base Station
GPRS General Packet Radio Service
GTP-U GPRS Tunneling Protocol User Plane
HSS Home Subscriber Service
ID Identifier
IE Information Element
IETF Internet Engineering Task Force
IMS Internet Protocol Multimedia Subsystem
IMSI International Mobile Subscriber Identity
IP Internet Protocol
LTE Long Term Evolution
M2M Machine-to-Machine
MFBR Maximum Flow Bit Rate
MM Mobility Management
MME Mobility Management Entity
MT Mobile Terminated
MTC Machine Type Communication
MT-SMS Mobile-Terminated Short Message Service
NAS Non-Access Stratum
NF Network Function
NR New Radio
PCF Policy Control Function
PDN Packet Data Network
PDU Protocol Data Unit
PGW Packet Gateway
P-GW Packet Data Network Gateway
PPI Paging Policy Indication
QCI Quality of Service Class Identifier
QFI Quality of Service Flow Identifier
QoS Quality of Service
QoSI Quality of Service Information
RAN Radio Access Network
RFC Request for Comments
RRC Radio Resource Control
SCEF Service Capability Exposure Function
SGSN Serving GPRS Support Node
SGW Serving Gateway
SIP Session Initiation Protocol
SMF Session Management Function
SMS Short Message Service
TA Timing Advance
TC Textual Convention
TOS Type Of Service
TS Technical Specification
UDM Unified Data Management
UE User Equipment
UP User Plane
UPC User Plane Connection
UPF User Plane Function Those skilled in the art will recognize improvements and modifications to the embodiments of the present disclosure. All such improvements and modifications are considered within the scope of the concepts disclosed herein.

What is claimed is:

1. A method of paging policy differentiation at an Access Management Function, AMF, in a Fifth Generation, 5G, telecommunications network, the method comprising:
    receiving, from a Session Management Function, SMF, Quality of Service, QoS, Information, QoSI, comprising information that identifies a QoS flow;
    in response to receiving the QoSI from the SMF, determining whether a paging policy selection should be performed by the AMF or by a Radio Access Node, RAN, that serves a target User Equipment, UE;
    in response to determining that the paging policy selection should be performed by the AMF, performing the paging policy selection based at least on the QoSI, and sending a paging message to the RAN according to the selected paging policy; and
in response to determining that the paging policy selection should be performed by the RAN, providing paging policy information to the RAN;
wherein determining whether the paging policy selection should be performed by the AMF or by the RAN comprises:
determining whether the target UE is in a Connection Management, CM, Connected, Radio Resource Control, RRC, Idle state;
in response to determining that the target UE is in the CM-Connected, RRC-Idle state, determining that the paging policy selection should be performed by the RAN; and
in response to determining that the target UE is not in the CM-Connected, RRC-Idle state, determining that the paging policy selection should be performed by the AMF.

2. The method of claim 1 wherein the QoSI comprises a QoS Flow Indicator, QFI.

3. The method of claim 1 wherein receiving the QoSI comprises receiving the QoSI in an N11 message.

4. The method of claim 1 wherein performing the paging policy selection by the AMF comprises:
using the received QoSI to determine a 5G QoS Indicator, 5QI, value and an Allocation and Retention Priority, ARP, value; and
selecting the paging policy based on the 5QI and ARP values.

5. The method of claim 4 wherein the paging policy is selected based also on at least one of: a Data Network Name, DNN; a Protocol Data Unit, PDU, session Identifier; and a local configuration.

6. The method of claim 5 wherein performing the paging policy selection by the AMF comprises selecting the paging policy per International Mobile Subscriber Identity, IMSI, based on at least one of: the QoSI; the DNN; the PDU session identifier; and a mobility pattern.

7. The method of claim 1 wherein the paging policy comprises a network operator defined profile.

8. The method of claim 7 wherein the network operator defined profile defines at least one of: a paging scope; a waiting time; and a paging repetition logic.

9. The method of claim 1 wherein performing the paging policy selection by the AMF comprises using a value of the QoSI as an index into a table or set of rules for selecting a paging policy.

10. The method of claim 1 wherein the paging policy comprises a paging profile and a paging priority.

11. The method of claim 1 wherein providing paging policy information to the RAN comprises sending, to the RAN, an N2 request message comprising the paging policy information.

12. The method of claim 11 wherein the paging policy information comprises at least one of: the QoSI; and paging priority information.

13. A method of paging policy differentiation in a Fifth Generation, 5G, telecommunications network, the method comprising:
at a User Plane Function, UPF:
receiving downlink data for a target User Equipment, UE; and
in response to receiving the downlink data, providing a data notification to a Session Management Function, SMF, the data notification comprising Quality of Service, QoS, Information, QoSI, comprising information that identifies a QoS flow;
at the SMF:
in response to receiving the data notification from the UPF, providing the QoSI to an Access Management Function, AMF;
at the AMF:
in response to receiving the QoSI from the SMF, determining whether a paging policy selection should be performed by the AMF or by a Radio Access Node, RAN, that serves a target User Equipment, UE;
in response to determining that the paging policy selection should be performed by the AMF, performing the paging policy selection based at least on the QoSI, and sending a paging message to the RAN according to the selected paging policy; and
in response to determining that the paging policy selection should be performed by the RAN, providing paging policy information to the RAN;
at the RAN:
in response to receiving the paging message from the AMF, paging the target UE; and
in response to receiving paging policy information from the AMF, performing the paging policy selection based at least on the received paging policy information and paging the target UE according to the selected paging policy;
wherein determining whether the paging policy selection should be performed by the AMF or by the RAN comprises:
determining whether the target UE is in a Connection Management, CM, Connected, Radio Resource Control, RRC, Idle state;
in response to determining that the target UE is in the CM-Connected, RRC-Idle state, determining that the paging policy selection should be performed by the RAN; and
in response to determining that the target UE is not in the CM-Connected, RRC-Idle state, determining that the paging policy selection should be performed by the AMF.

14. An Access Management Function, AMF, in a Fifth Generation, 5G, telecommunications network, the AMF comprising:
one or more processors; and
memory storing instructions executable by the one or more processors, whereby the AMF is operable to:
receive, from a Session Management Function, SMF, Quality of Service, QoS, Information, QoSI, comprising information that identifies a QoS flow;
in response to receiving the QoSI from the SMF, determine whether a paging policy selection should be performed by the AMF or by a Radio Access Node, RAN, that serves a target User Equipment, UE;
in response to determining that the paging policy selection should be performed by the AMF, perform the paging policy selection based at least on the QoSI, and send a paging message to the RAN according to the selected paging policy; and
in response to determining that the paging policy selection should be performed by the RAN, provide paging policy information to the RAN;
wherein determining whether the paging policy selection should be performed by the AMF or by the RAN comprises:

determining whether the target UE is in a Connection Management, CM, Connected, Radio Resource Control, RRC, Idle state;

in response to determining that the target UE is in the CM-Connected, RRC-Idle state, determining that the paging policy selection should be performed by the RAN; and in response to determining that the target UE is not in the CM-Connected, RRC-Idle state, determining that the paging policy selection should be performed by the AMF.

15. An Access Management Function, AMF, in a Fifth Generation, 5G, telecommunications network, the AMF being adapted to:

receive, from a Session Management Function, SMF, Quality of Service, QoS, Information, QoSI, comprising information that identifies a QoS flow;

in response to receiving the QoSI from the SMF, determine whether a paging policy selection should be performed by the AMF or by a Radio Access Node, RAN, that serves a target User Equipment, UE;

in response to determining that the paging policy selection should be performed by the AMF, perform the paging policy selection based at least on the QoSI, and send a paging message to the RAN according to the selected paging policy; and in response to determining that the paging policy selection should be performed by the RAN, provide paging policy information to the RAN;

wherein determining whether the paging policy selection should be performed by the AMF or by the RAN comprises:

determining whether the target UE is in a Connection Management, CM, Connected, Radio Resource Control, RRC, Idle state;

in response to determining that the target UE is in the CM-Connected, RRC-Idle state, determining that the paging policy selection should be performed by the RAN; and in response to determining that the target UE is not in the CM-Connected, RRC-Idle state, determining that the paging policy selection should be performed by the AMF.

16. A non-transitory computer readable medium storing software instructions that, when executed by one or more processors of an Access Management Function, AMF, in a Fifth Generation, 5G, telecommunications network, cause the AMF to:

receive, from a Session Management Function, SMF, Quality of Service, QoS, Information, QoSI, comprising information that identifies a QoS flow;

in response to receiving the QoSI from the SMF, determine whether a paging policy selection should be performed by the AMF or by a Radio Access Node, RAN, that serves a target User Equipment, UE;

in response to determining that the paging policy selection should be performed by the AMF, perform the paging policy selection based at least on the QoSI, and send a paging message to the RAN according to the selected paging policy; and in response to determining that the paging policy selection should be performed by the RAN, provide paging policy information to the RAN;

wherein determining whether the paging policy selection should be performed by the AMF or by the RAN comprises:

determining whether the target UE is in a Connection Management, CM, Connected, Radio Resource Control, RRC, Idle state;

in response to determining that the target UE is in the CM-Connected, RRC-Idle state, determining that the paging policy selection should be performed by the RAN; and in response to determining that the target UE is not in the CM-Connected, RRC-Idle state, determining that the paging policy selection should be performed by the AMF.

17. A Fifth Generation, 5G, telecommunications network for paging policy differentiation, the network comprising:

a User Plane Function, UPF, that receives downlink data for a target User Equipment, UE; and, in response to receiving the downlink data, provides a data notification to a Session Management Function, SMF, the data notification comprising Quality of Service, QoS, Information, QoSI, comprising information that identifies a QoS flow;

the SMF that, in response to receiving the data notification from the UPF, provides the QoSI, to an Access Management Function, AMF;

the AMF that, in response to receiving the QoSI from the SMF: determines whether a paging policy selection should be performed by the AMF or by a Radio Access Node, RAN, that serves the target UE; in response to determining that the paging policy selection should be performed by the AMF, performs the paging policy selection based at least on the QoSI, and sends the paging message to the RAN according to the selected paging policy; and, in response to determining that the paging policy selection should be performed by the RAN, provides paging policy information to the RAN; and the RAN that, in response to receiving the paging message from the AMF, pages the target UE; and that, in response to receiving the paging policy information from the AMF, performs the paging policy selection based at least on the received paging policy information and pages the target UE according to the selected paging policy;

wherein determining whether the paging policy selection should be performed by the AMF or by the RAN comprises:

determining whether the target UE is in a Connection Management, CM, Connected, Radio Resource Control, RRC, Idle state;

in response to determining that the target UE is in the CM-Connected, RRC-Idle state, determining that the paging policy selection should be performed by the RAN; and in response to determining that the target UE is not in the CM-Connected, RRC-Idle state, determining that the paging policy selection should be performed by the AMF.

* * * * *